(12) United States Patent
Taniuchi et al.

(10) Patent No.: US 7,924,458 B2
(45) Date of Patent: Apr. 12, 2011

(54) METHOD FOR MANUFACTURING THREE-DIMENSIONAL OBJECT, THREE-DIMENSIONAL OBJECT, AND PRINT MEDIUM

(75) Inventors: Hiroshi Taniuchi, Yokohama (JP); Akihiro Mouri, Tokyo (JP); Koichiro Nakazawa, Tokyo (JP); Kazuhiro Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1117 days.

(21) Appl. No.: 11/616,540

(22) Filed: Dec. 27, 2006

(65) Prior Publication Data

US 2007/0146734 A1    Jun. 28, 2007

(30) Foreign Application Priority Data

Dec. 28, 2005 (JP) ................................ 2005-380069
Dec. 28, 2005 (JP) ................................ 2005-380070
Nov. 28, 2006 (JP) ................................ 2006-320540

(51) Int. Cl.
*G06F 15/00* (2006.01)
*G06F 19/00* (2011.01)

(52) U.S. Cl. ........................................ 358/1.8; 700/118

(58) Field of Classification Search .................. 358/1.1, 358/1.8, 1.13, 1.15, 1.18, 302; 345/6, 7, 345/9; 700/118
See application file for complete search history.

(56) References Cited

U.S. PATENT DOCUMENTS

| | | | | |
|---|---|---|---|---|
| 5,260,009 A | * | 11/1993 | Penn | 264/401 |
| 6,169,605 B1 | * | 1/2001 | Penn et al. | 358/1.1 |
| 6,175,422 B1 | * | 1/2001 | Penn et al. | 358/1.1 |
| 6,534,221 B2 | * | 3/2003 | Lee et al. | 430/5 |
| 2003/0022070 A1 | * | 1/2003 | Lee et al. | 430/5 |
| 2005/0142341 A1 | * | 6/2005 | Carls et al. | 428/195.1 |
| 2005/0285312 A1 | * | 12/2005 | Fury et al. | 264/401 |
| 2006/0078470 A1 | * | 4/2006 | Zhou et al. | 422/100 |

FOREIGN PATENT DOCUMENTS

WO    2005/037529    4/2005

* cited by examiner

*Primary Examiner* — Gabriel I Garcia
(74) *Attorney, Agent, or Firm* — Fitzpatrick, Cella, Harper & Scinto

(57) ABSTRACT

An object of the present invention is to provide a method for manufacturing a three-dimensional object which method is able to easily manufacture a three-dimensional object using a low-cost apparatus. The present invention thus manufactures a three-dimensional object containing a three-dimensional image by printing a two-dimensional image on print media each having at least an ink receiving layer and a bonding layer, on the basis of an ink jet scheme, and stacking the print media on which the two-dimensional image is printed so that the print media are bonded together via the bonding layers.

6 Claims, 17 Drawing Sheets

METHOD FOR MANUFACTURING THREE-DIMENSIONAL OBJECT, THREE-DIMENSIONAL OBJECT, AND PRINT MEDIUM

BACKGROUND OF THE INVENTION

1. Field of the Invention

The present invention relates to a method for manufacturing a three dimensional object which method enables a three-dimensional object of a desired shape to be easily created, a three-dimensional object manufactured by the manufacturing method, and a print medium used in the method for manufacturing a three-dimensional object.

2. Description of the Related Art

In recent years, ink jet printers have made noticeable progress. In particular, home use printers are now able to output high quality images that favorably compare with silver photographs. With prevailing digital cameras and personal computers, ink jet printers are spreading rapidly among families. This means that the market accepts the value of the ink jet printer, which enables users to easily create original images by themselves.

On the other hand, improved displays and image processing apparatuses have enabled users to enjoy viewing two-dimensional images including photographs on the screen without the need to output them to print media such as paper. This trend is expected to continue in the future. In that case, two-dimensional images such as print matter may lose their current significant values.

One of the values demanded by the market in the future is a three-dimensional appearance. Three-dimensional images or objects can express three-dimensional appearances. Much attention is now being paid to small three-dimensional objects such as small dolls called figures and mascots attached to cellular phones. The market further strongly demands original three-dimensional objects as is the case with two-dimensional images. Thus, there has been a strong desire to meet these requirements.

The most common method for creating such a three-dimensional object as described above involves the steps of pouring resin into a mold to form a three-dimensional object and coloring the object. However, the mold is expensive and the molding of resin requires large-scale facilities. The coloring requires a long time and appropriate skills. Thus, this method does not worth the cost unless three-dimensional objects are mass-produced. Therefore, this method is unsuitable for small-lot production.

A typical method for creating a three-dimensional object without any mold is an optical shaping system. This system can create a three-dimensional object by irradiating a liquid photo hardening resin with laser light. However, an apparatus for implementing this method is very expensive. Further, this method needs to carry out coloring in a separate process.

An inexpensive proposed system for creating an original three-dimensional object uses ink jet method. For example, Japanese Patent Application Laid-open No. 6-198746 (1994) proposes means for ejecting a photo hardening resin or hot melt ink from an ink jet head so as to stack it. However, this system is limited in that it is unable to create an overhung shape having no underlying support. This system further requires a separate coloring process.

To solve the problem described in Japanese Patent Application Laid-open No. 6-198746 (1994), Japanese Patent Application Laid-open No. 2002-264221 discloses a method for forming a three-dimensional object using an ink jet method. This method uses an ink jet printing apparatus to repeat an operation of ejecting ink into resin powder to stack ink. The ink applied and stacked portion is then irradiated with an electromagnetic wave and thus hardened. Unwanted resin powder is then removed from the image formed, to form a three-dimensional object. This method can reproduce an overhung shape and can achieve coloring simultaneously with the reproduction by mixing coloring agent into the ink.

However, the method described in Japanese Patent Application Laid-open No. 2002-264221 requires a height limiting mechanism as well as handling of the material (powder). Therefore, this method requires a complicated manufacturing process and high apparatus costs.

SUMMARY OF THE INVENTION

An object of the present invention is to provide a method for manufacturing a three-dimensional object which method is able to easily manufacture a three-dimensional object using a low-cost apparatus. The present invention thus has the following configuration.

A first aspect of the present invention is a method for manufacturing a three-dimensional object, the method comprising: a printing step of printing an image on print media each having at least an ink receiving layer and a bonding layer by ejecting ink from an ink jet head to the ink receiving layer; and a stacking step of sequentially stacking the print media on which the image is printed so that the print media are bonded together via the bonding layers.

Here, the sheet-like print medium may be transparent. The method for manufacturing a three-dimensional object according to the first aspect may further comprises a removing step of removing the part of the print medium in which the image is not printed. Transparency of sides of the three-dimensional object maybe increased. Preferably, images are printed on a plurality of division media (chips) into which the print media has been divided, and the plurality of division media are stacked to manufacture a three-dimensional object.

The present invention can easily create a desired three-dimensional object by stacking print media on which images are printed. For example, printing images on transparent print media and stacking the media enables the easy manufacture of a three-dimensional object comprising a transparent member containing a three-dimensional image.

Further features of the present invention will become apparent from the following description of exemplary embodiments (with reference to the attached drawings).

DESCRIPTION OF THE EMBODIMENTS

Embodiments of the present invention will be described below in detail with reference to the drawings.

First Embodiment

First, a first embodiment of the present invention will be described in detail.

Figure 1:
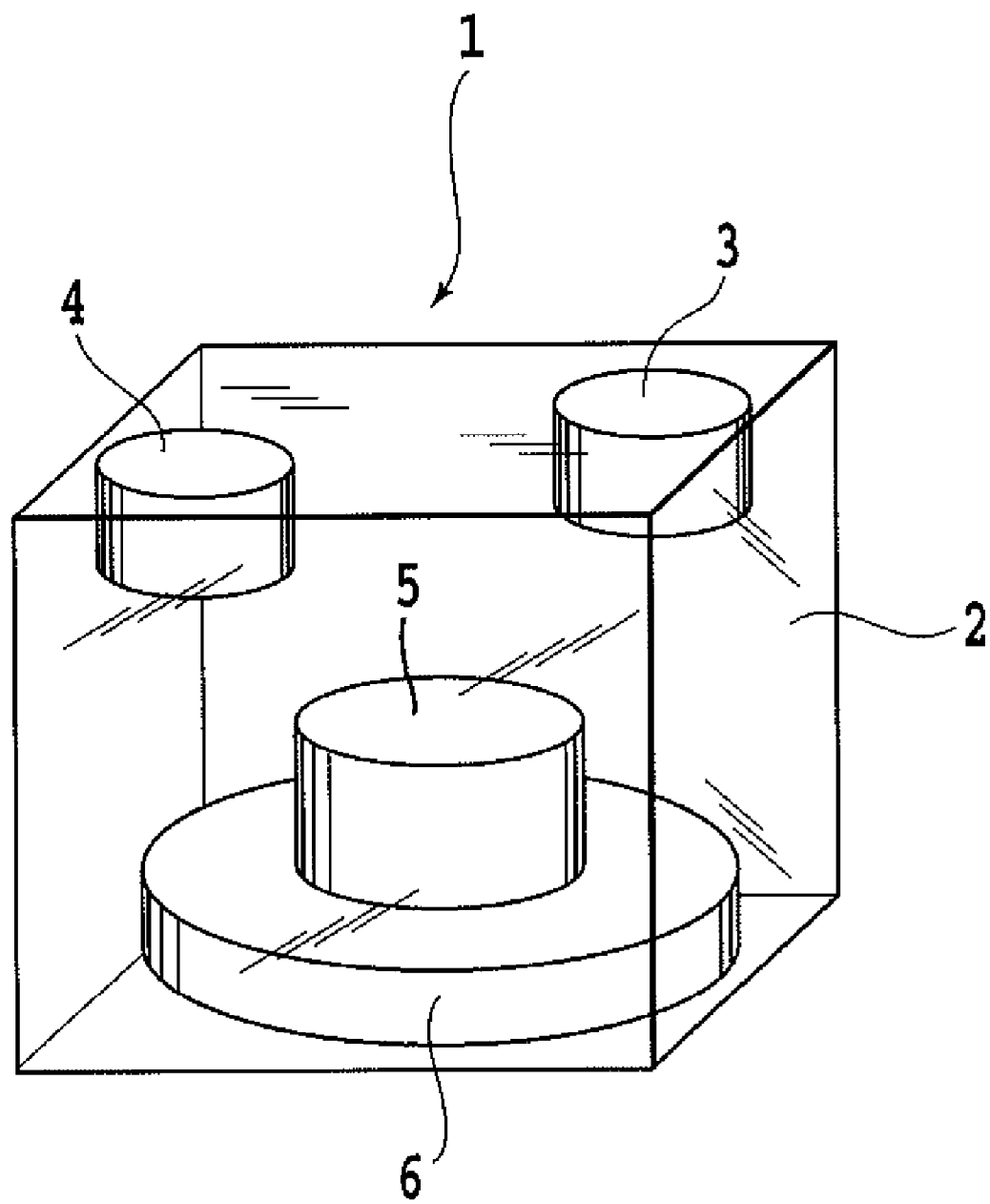
FIG. 1 is a perspective view showing a three-dimensional object formed according to an embodiment of the present invention.

The present embodiment forms (manufactures), for example, a three-dimensional object 1 such as the one shown in FIG. 1. The three-dimensional object 1, shown in FIG. 1, comprises a transparent member 2 shaped like a rectangular parallelepiped containing a plurality of colored three-dimensional objects (for example, 3, 4, 5, and 6).

Figure 4:
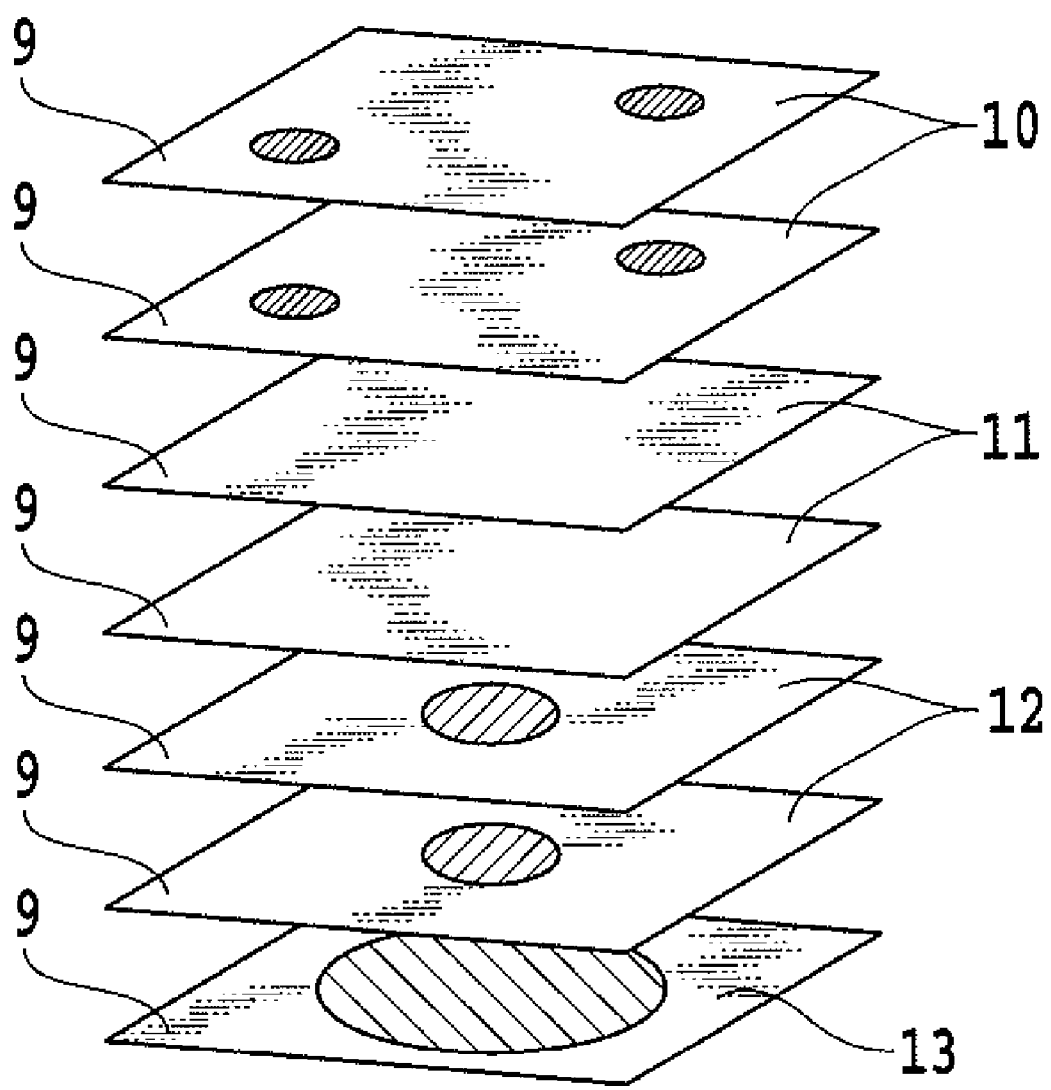
FIG. 4 is a perspective view schematically showing that print medium chips are stacked in a stacking step according to the embodiment of the present invention.
Figure 15:
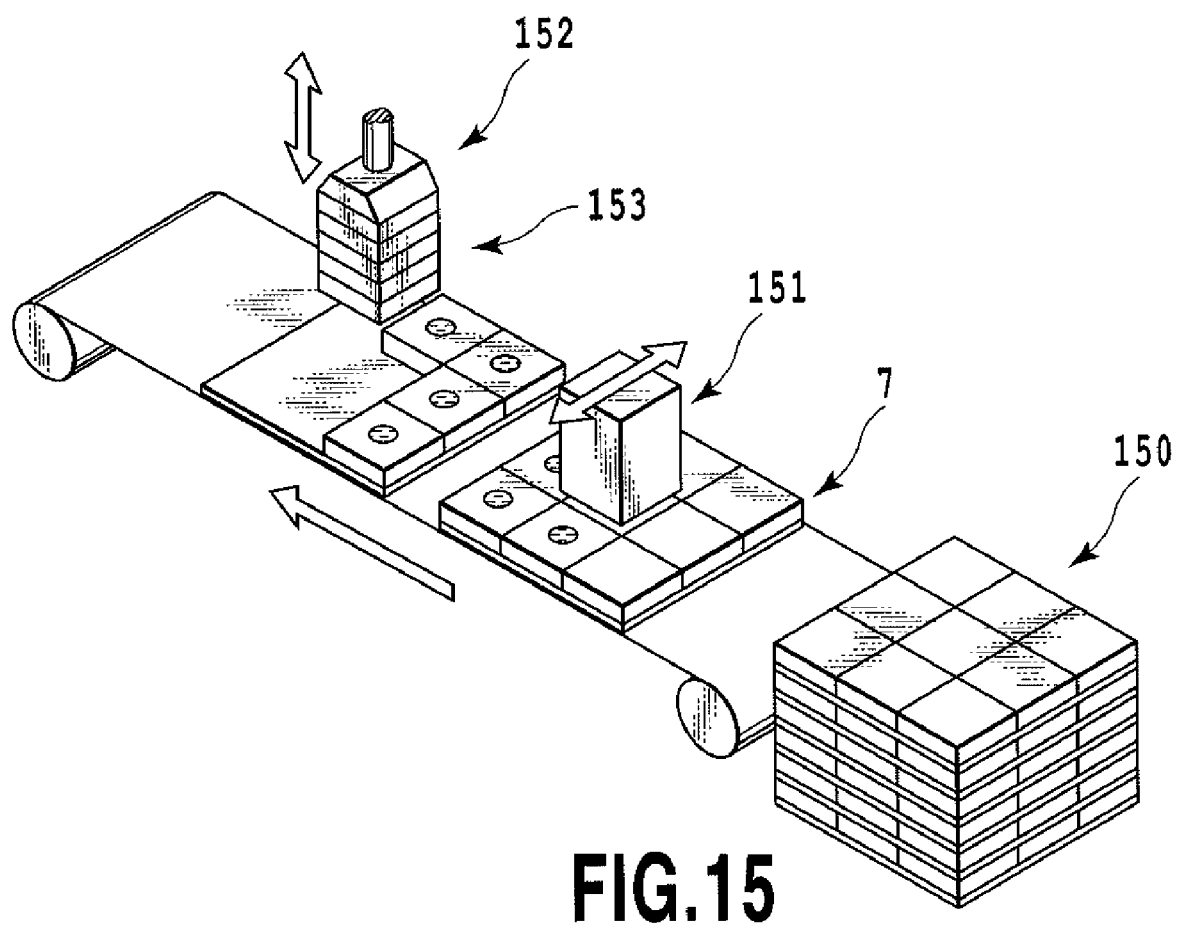
FIG. 15 is a diagram showing a manufacturing apparatus that is able to manufacture a three-dimensional object using an ink jet scheme.

The present embodiment manufactures the three-dimensional object 1 such as the one shown in FIG. 1 by stacking chips 9 on which two-dimensional images such as those shown in FIG. 4 are formed, in a height direction as shown in FIG. 6. FIG. 15 is a schematic diagram of a manufacturing apparatus that uses an ink jet method to manufacture a three-dimensional object such as the one shown in FIG. 1.

Figure 3:
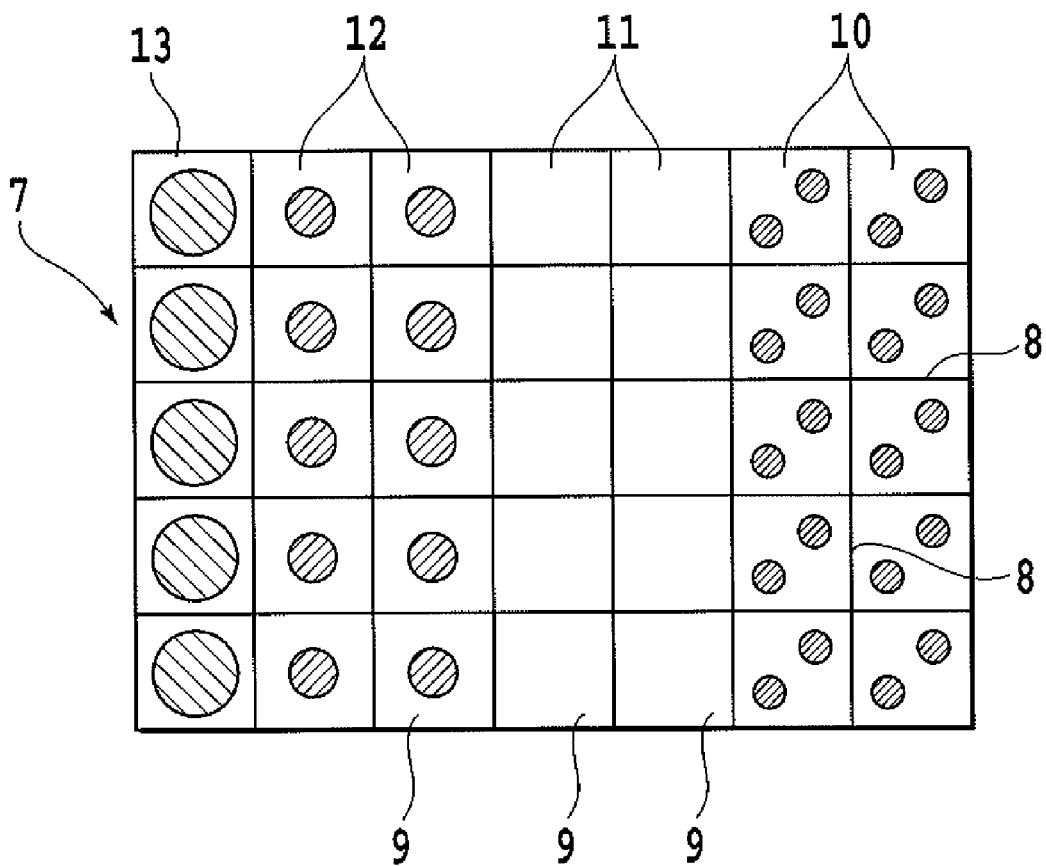
FIG. 3 is a plan view showing that a two-dimensional print image is formed on the print medium shown in FIG. 2, in a printing step according to the embodiment of the present invention.

In FIG. 15, a print medium 7 fed by a sheet feeding section 150 is conveyed to a position where it lies opposite an ink jet head 151. The ink jet head 151 ejects ink to an ink receiving layer of the print medium conveyed to this position. A two-dimensional image such as the one shown in FIG. 3 is formed on a plurality of division media (chips) into which the print medium 7 is divided. The plurality of chips 9 on which the two-dimensional image is formed are released from a separator, a component of the print medium, by releasing means 152 such as an arm. The released chips 9 are stacked by a stacking section 153 as shown in FIGS. 4 and 6. A jig 20 shown in FIG. 5 and described below may be used as the stacking section 153. The three-dimensional object 1 (see FIG. 1) formed by stacking the chips is removed from the stacking section 153 and passed to a transparency processing section (not shown) as required. The transparency processing section subjects a side of the three-dimensional object to a transparency increasing process such as the one shown in FIGS. 13A and 13B or 14.

Now, the process of manufacturing the three-dimensional object shown in FIG. 1 will be described with reference to FIGS. 2 to 5 and 15 to 17.

Figure 17A:
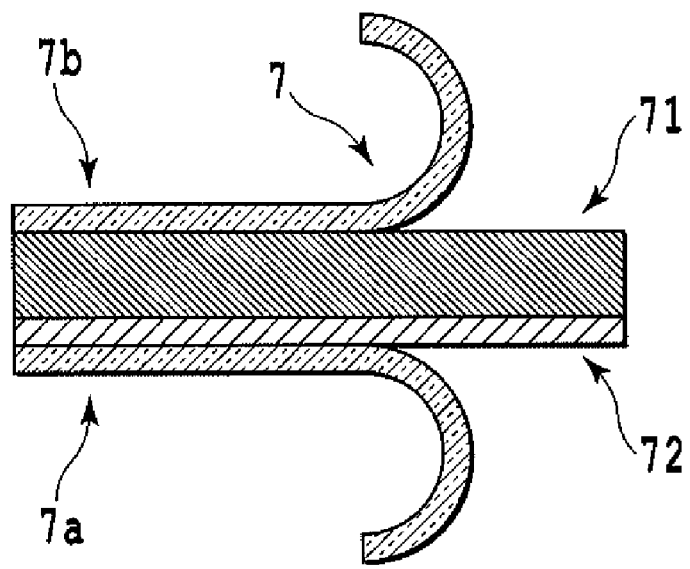
FIGS. 17A and 17B is a side view showing an example of layer configuration of a print medium that is applicable according to the present invention.
Figure 17B:
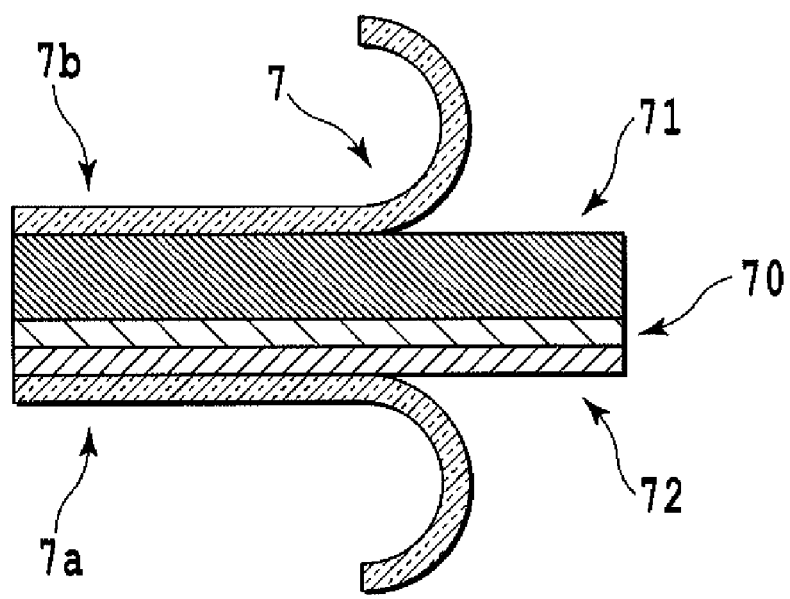

First, the layer configuration of a print medium used in manufacturing a three-dimensional object applicable to the present invention will be described. FIGS. 17A and 17B are a sectional view showing an example of layer configuration of the print medium applicable to the present invention. The print medium applicable to the present invention includes at least two layers, that is, an ink receiving layer 71 on which an image is printed and a bonding layer 72 that reduces misalignment during stacking as shown in FIGS. 17A and 17B. Other layers may be provided as required. For example, in addition to the above two layers, the print medium in FIG. 17A has a cover film 7b and a separator (releasing layer) 7a in order to improve operability. The cover film 7b and separator 72 are finally released from the print medium and may thus be provided as required. On the other hand, the print medium shown in FIG. 17B has a base material 70 between the ink receiving layer 71 and the bonding layer 72. The base material 70 is effective for increasing the strength of the three-dimensional object. The base material 70 may also be provided as required.

Figure 2:
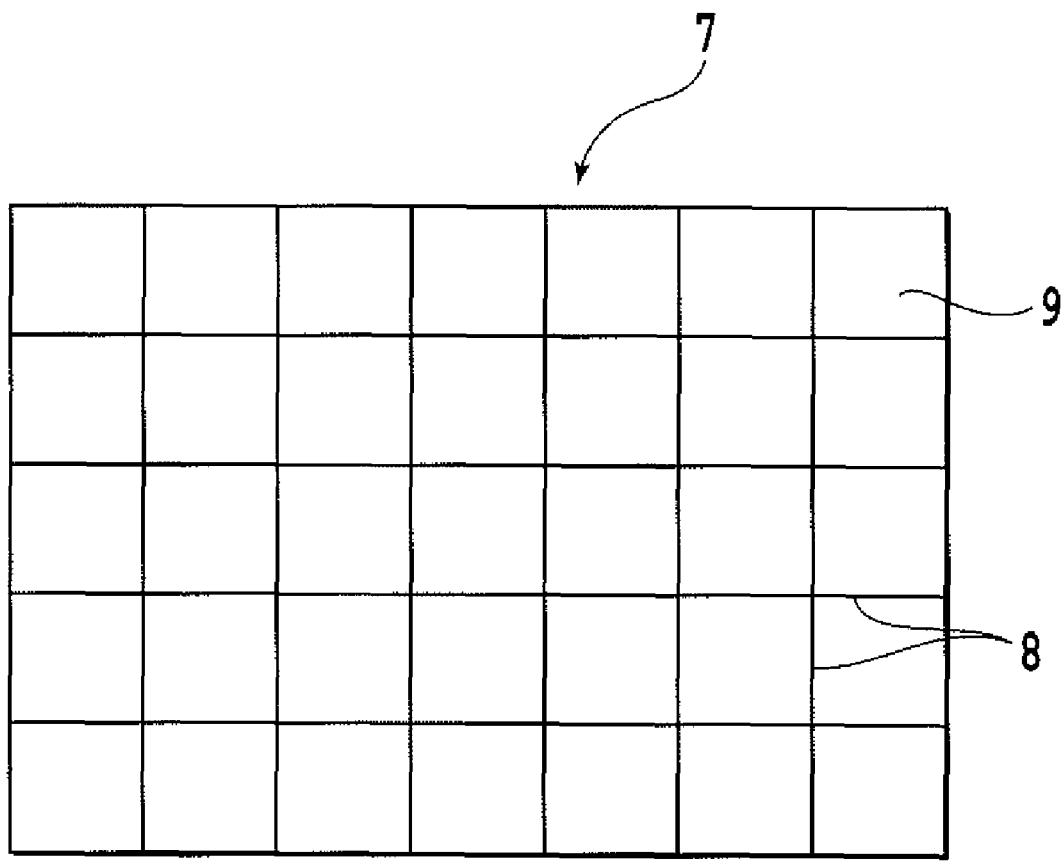
FIG. 2 is a plan view showing an example of a sheet-like print medium that is usable according to an embodiment of the present invention.
Figure 16:
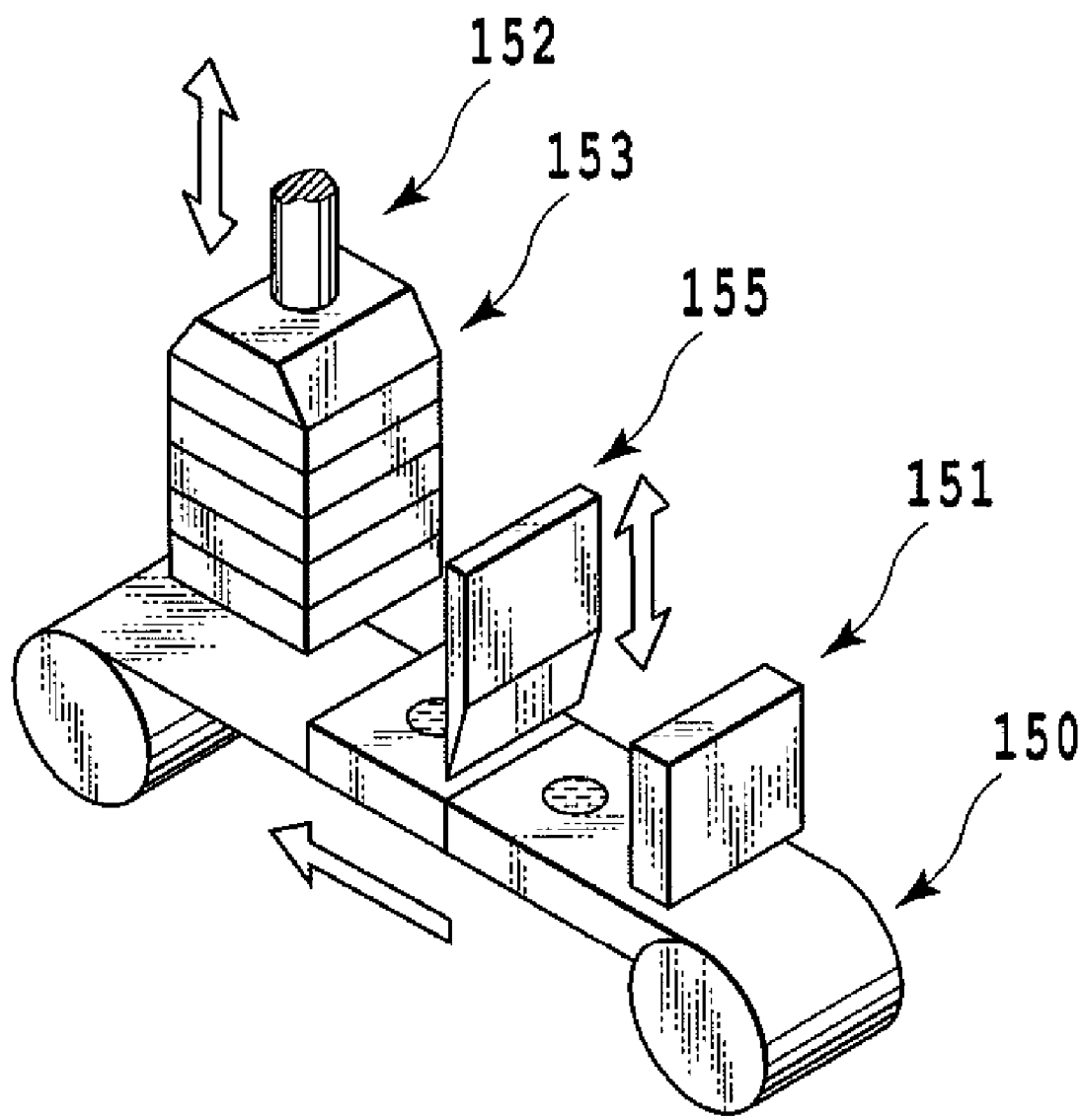
FIG. 16 is a diagram showing a manufacturing apparatus that is able to manufacture a three-dimensional object using the ink jet scheme.

FIG. 2 shows an example of a sheet-like print medium 7 that is usable according to the present invention. The print medium 7 includes an ink receiving layer 71 and a bonding layer 70 such as those described in FIGS. 17A and 17B. The print medium 7 has a plurality of rectangular areas (medium chips) 9 of a fixed size enclosed by cut grooves 8 formed in a longitudinal direction and in a lateral direction. The print medium may have a shape different from that of a sheet and may be shaped like, for example, a roll. With a roll-like print medium, for example, a manufacturing apparatus such as the one shown in FIG. 16 may be used. The manufacturing apparatus in FIG. 16 is adapted to allow the ink jet head 151 to print an image on the print medium and then to allow cutting means 155 to cut the print medium into chips. Of course, the form in which the sheet-like print medium is used is not limited to the one in which the print medium is cut into chips after image printing. For example, a roll-like print medium may be used on which chips have already been formed. FIG. 3 shows that the ink jet apparatus in FIG. 15 is used to form a two-dimensional print image on the ink receiving layer 71 of the print medium 7 shown in FIG. 2. As shown in the figure, two-dimensional images into which the three-dimensional object shown in FIG. 1 is divided (sliced) at increments of a fixed height are each formed on one medium chip 9 including the ink receiving layer and bonding layer 72 of the print medium 7. For example, slicing the three-dimensional object 1, shown in FIG. 1, sequentially downward along horizontal surfaces forms two-dimensional images 10, 11, 12, and 13 on the medium chips. Reference numeral 10 denotes two-dimensional images including slice images of three-dimensional images 3 and 4. Reference numeral 11 denotes a transparent part in which no three-dimensional image is present (space). Reference numeral 12 denotes images including slice images of a three-dimensional image 5. Reference numeral 13 denotes images including slice images of a three-dimensional image 6.

Print data on the two-dimensional image printed on each medium chip 9 is sectional data obtained by slicing three-dimensional data expressing the three-dimensional object to be formed, at increments of a fixed thickness along a two-dimensional direction. Consequently, the number of required medium chips 9 on which two-dimensional images are printed is the same as that of the slice data. Here, two-dimensional image data is obtained by slicing three-dimensional data at increments of thickness of the print medium used. Three-dimensional image data can be created by three-dimensional CAD modeling software. The three-dimensional image data may be shape data and texture obtained by measuring the three-dimensional object using a three-dimensional input apparatus.

FIG. 4 shows a stacking step of stacking the two-dimensional print images formed in the printing step. Here, as shown in FIG. 3, the plurality of print medium chips 9 on which the two-dimensional images are printed are sequentially stacked in order of the slice images. This forms the three-dimensional object 1 shown in FIG. 1.

The method for creating a three-dimensional object which method is configured as described eliminates large-scale facilities and enables the use of a commercially available ink jet printing apparatus. Thus, this method can easily create an original three-dimensional object using a low-cost apparatus. Further, the three-dimensional images 3, 4, 5, and 6 are contained in the transparent member T, enabling the reproduction of a fine shape that is easily broken or an overhung shape. Consequently, even a three-dimensional object such as "fireworks" can be reproduced which is spatially expressed as a set of independent images with no contacts among them. Varying the color of ink ejected from the ink jet printing apparatus enables simultaneous coloring. Further, print media 7 are stacked while being bonded together via bonding layers 72. This reduces misalignment during stacking, providing high-quality three-dimensional images. Since print media are bonding each other while stacking the print media, misalignment during stacking is reduced in the above procedure. Thereby, high-quality three-dimensional image is produced.

Now, the printing step and stacking step will be described in further detail with reference to members and devices used in implementing these steps.

1. Printing Step

The printing step forms a two-dimensional image on a print medium using the ink jet printing apparatus in FIG. 15. The print medium that can be used according to the present embodiment is not limited as long as it has an ink receiving layer comprising a material that can fix ink and the above bonding layer. An ink receiving layer (for example, an ink absorbing porous member or an ink solving resin) is more desirable in improving the smoothness of stacked portion of a three-dimensional image formed.

The print medium is desirably transparent in terms of the visibility of a three-dimensional object. The term "transparency" as used herein means that the three-dimensional images contained in a three-dimensional object are visible. However, to emphasize a three-dimensional object, it is possible to manufacture a three-dimensional object in which opaque print media are interposed among a plurality of stacked transparent print media.

The material used for the ink receiving layer, a component of the print medium, is not particularly limited as long as it meets the above conditions. For example, a water-soluble resin of average molecular weight about 1,000 to 15,000 can preferably be used as an ink absorbing material.

Examples of the material include a vinyl-containing water-soluble resin, styrene and its derivative, vinyl naphthalene and its derivative, aliphatic alcohol ester of $\alpha$, $\beta$-ethylene unsaturated carboxylic acid, acrylic acid and its derivative, a block copolymer or random copolymer comprising maleic acid and its derivative, itaconic acid and its derivative, or fumaric acid and its derivative, as well as their salts. Among these examples, PVA (Poly Vinyl Alcohol), PVP (Poly Vinyl Pyrrolidone), and an acrylic acid resin are preferably used.

The print medium applied to the present embodiment is pre-provided with the bonding layer 72 in addition to the ink receiving layer 71. Accordingly, the ink receiving layer 71 need not be adhesive. However, a print medium having no bonding layer requires the ink receiving layer itself to be adhesive. Thus, in a print medium having no bonding layer, the ink receiving layer desirably comprises a material that is to become adhesive. Thus, in this case, a material that is dissolved or swollen by a liquid component of ink is adopted as a receiving material. In this receiving material, a part of the receiving layer to which ink has been applied becomes adhesive and can thus be used as a bonding layer. Ink is not applied to a non-image portion, which thus does not become adhesive. To allow the non-image part to exert a bonding effect, transparent ink can be effectively applied to the non-image portion.

Preferable materials for the bonding layer, a component of the print medium, include, for example, urethane-, acrylic-, and silicone-containing adhesives.

A wide range of materials which can be used as the base material, including cellulose-containing resin, ethylene-containing resin, EVA-containing resin, acrylic-containing resin, butadiene-containing resin, polybutylene-containing resin, polycarbonate-containing resin, polyether sulfone resin, polyethylene resin, vinyl-containing resin, and polyester-containing resin. In particular, acrylic resin, polypropylene, and vinyl chloride resin are preferably used.

The thickness of the print medium has a certain effect on the resolution of three-dimensional images or objects in their height direction and is thus selected as required. The thickness of the print medium also has a certain effect on ink absorption amount and is thus used to adjust ink application amount. The amount of ink applied to the print medium is preferably such that ink applied to a chip from its front surface reaches its back surface. Thus coloring the chip with ink from one end (front surface) to the other end (back surface) in its thickness direction, colored portions of stacked chips are almost continuous in the thickness. This results in a three-dimensional object that gives a minimized sense of discomfort. Accordingly, to achieve a high resolution in the height (thickness) direction, it is necessary to use a thinner print medium and a reduced amount of ink applied. Creation of a high-resolution three-dimensional image (three-dimensional object) requires more print media and a larger amount of data than creation of a low-resolution three-dimensional image. Since the magnitude of stacking misalignment increases with the number of media stacked, it is effective to simultaneously carry out stacking and bonding as in the present embodiment in order to create a high-resolution three-dimensional image.

For actual printing by the ink jet printing apparatus, the print medium needs to have a thickness and rigidity suitable for handling. However, the print medium may be soft or may be stretchable. In this case, as shown in FIG. 17B, the print medium may be provided with a separator (releasing layer) 7a. The separator 7a is also effective in protecting the bonding layer from dust or the like. With handling and the conveying capability taken into account, the separator 7a should be provided when conditions permit.

Desirably, partly to prevent adhesion of dust or moisture, a cover film is desirably provided on the surface (ink impacting surface) of the print medium before use and released immediately before image formation.

To stack print media (medium chips) after image formation, reference surfaces are required to accurately stack the print media. To create a small three-dimensional object, it is effective to print slice images of the three-dimensional object for different height positions on one sheet and then to cut the sheet into the medium chips on which the respective slice images are printed and which are then stacked, as described above. However, in this case, obtaining a reference for positioning for stacking is difficult. Consequently, effective means uses a print medium comprising medium chips of a standardized size into which a sheet has been cut and which are fixed to one separator (releasing layer) 7a; after image formation, the sheet is cut into the medium chips, which are then stacked.

To be prevented from being stacked in the wrong order, the print media may be provided with numbers of a size that does not cause any visual problem.

The ink jet ejecting method for the ink jet head used in the present invention is not particularly limited. That is, an apparatus based on a thermal method, a piezo scheme, or a continuous scheme may be appropriately selectively used. Further, known printing schemes for the ink jet printing apparatus include a full line type and a serial type. However, any type of printing scheme is applicable. A printing apparatus is also applicable which uses an XY stage that can move the print medium in two orthogonal directions (X direction, Y direction, and direction obtained by synthesizing the X and Y directions) on a plane. FIG. 15, described above, shows a serial type ink jet printing apparatus. FIG. 16 shows a full line type ink jet apparatus.

The ink used is not particularly limited and may be aqueous or oily (solvent-containing) ink having a dye or pigment commonly used as an ink color material and a solvent that solves and/or disperses the dye or pigment. In particular, the aqueous ink is preferably used in terms of safety and environmental problems. Accordingly, the description below centers on the aqueous ink. The color material can be effectively selected taking transparency into account.

Examples of the dye include:
C. I direct blue 6, 8, 22, 34, 70, 71, 76, 78, 86, 142, and 190,
C. I acid blue 9, 22, 40, 59, 93, 102, 104, 117, 120, 167, and 229,
C. I direct acid 1, 4, 17, 28, 83, and 227,
C. I acid red 1, 4, 8, 13, 14, 15, 18, 21, 26, 35, 37, 249, 257, and 289,
C. I direct yellow 12, 24, 26, 86, 98, 132, and 142,
C. I acid yellow 1, 3, 4, 7, 11, 12, 13, 14, 19, 23, 25, 34, 44, and 71,
C. I food black 1 and 2, and
C. I acid black 2, 7, 24, 26, 31, 52, 112, and 118.

Examples of the pigment include:
C. I pigment blue 1, 2, 3, 15:3, 16, and 22,
C. I pigment red 5, 7, 12, 48 (Ca), 48 (Mn), 57 (Ca), 112, and 122,
C. I pigment yellow 1, 2, 3, 13, 16, and 83, and
Carbon black No. 2300, 900, 33, 40, 52, MA7, 8, MCF88 (MITSUBISHI CHEMICAL CORPORATION), RAVEN1255 (Columbia), REGAL330R, 660R, MOGUL (Cabbot), Color Black FW1, FW18, S170, S150, Printex35 (Degussa).

The form of these pigments is not limited. For example, self-dispersion type, resin dispersion type, a microcapsule type and the like may be used. A preferable dispersant used for the pigment is a water-soluble dispersion resin having an average molecular weight of about 1,000 to 15,000.

Examples of the dispersant include a vinyl-containing water-soluble resin, styrene and its derivative, vinyl naphthalene and its derivative, aliphatic alcohol ester of $\alpha$, $\beta$-ethylene unsaturated carboxylic acid, acrylic acid and its derivative, a block copolymer or random copolymer comprising maleic acid and its derivative, itaconic acid and its derivative, or fumaric acid and its derivative, as well as their salts.

The aqueous solvent constituting ink together with the color material may contain an organic solvent. Examples of the organic solvent include polyethylene glycol, polypropylene glycol, ethylene glycol, propylene glycol, butylene glycol, and triethylene glycol. Examples also include thiodiglycol, hexylene glycol, diethylene glycol, ethylene glycol monomethyl ether, diethylene glycol monomethyl ether, and glycerin.

At least two types may be selected from these examples. Additionally, alcohol such as ethyl alcohol or isopropyl alcohol or a surface active agent may be added to the ink as a component that adjusts viscosity or surface tension.

The compound ratio of the compositions constituting the ink is also not limited and may be properly adjusted within a possible ejection range based on the ejecting force of the print head of the printing apparatus, nozzle diameter, or the like. In general, in terms of mass, the ink contains 0.1 to 10% of coloring material, 5 to 40% of solvent, and at most 0.01 to 5% of surface active agent, with the remaining amount adjusted with pure water.

If the print medium comprises a material that does not absorb the ink well, the ink may spread excessively or bleed depending on the ink application amount. The occurrence of these problems can be suppressed by pre-applying, to the surface of the print medium, ink viscosity increasing component (reactant) that can lower the flowability of the ink. That is, when the ink contacts the ink viscosity increasing component already applied to the print medium surface, the color material in the ink is aggregated, degrading the flowability of the color material on the print medium surface. In this configuration, the pre-applied ink viscosity increasing component (reactant) functions as the ink receiving layer and can thus be treated as the ink receiving layer.

The ink viscosity increasing agent needs to be appropriately selected depending on the type of the ink used. For example, a polymer aggregating agent can be effectively used for the dye ink. Metal ions can be effectively used for the pigment (which comprises dispersed particulates) ink. To use a combination of the ink viscosity increasing component and the metal ions in the dye ink, the ink is mixed with a pigment having a color similar to that of the dye or white or transparent particulates which do not significantly affect the color. Alternatively, a water-soluble resin that reacts with the metal ions may be added.

In the present invention, examples of the polymer aggregating agent used as an ink viscosity increasing agent include a cationic polymer aggregating agent, an anionic polymer aggregating agent, a nonionic polymer aggregating agent, an amphoteric polymer aggregating agent. Examples of the metal ion include bivalent metal ions such as $Ca^{2+}$, $Cu^{2+}$, $Ni^{2+}$, $Mg^{2+}$, and $Zn^{2+}$ and trivalent metal ions such as $Fe^{3+}$ and $Al^{3+}$. These ions are desirably applied in the form of a water solution of metal salt. Examples of anion of metal salt include $Cl^-$, $NO3^-$, $SO4^{2-}$, $I^-$, $Br^-$, $ClO3^-$, and $RCOO^-$ (R is an alkyl group).

The ink viscosity increasing component can function not only as a receiving layer but also as a bonding layer. That is, if the ink contains a resin component, a mixture of the ink viscosity increasing component with the ink results in adhesion properties along with evaporation of moisture. Accordingly, with ink containing a resin component, the ink viscosity increasing component can be used as a receiving layer and bonding layer (adhesive).

A method for applying the ink viscosity increasing component uses a material pre-mixed with the ink viscosity increasing component to produce a print medium or applies the material to a print medium immediately before image formation. In the latter case, an ink jet printing apparatus may be used to apply the material only to an ink adhering portion or a roll coaster, a spray coating device, or the like may be used to coat the material on the entire surface of the print medium.

If the print medium is water-repellent, the print medium surface is desirably made hydrophilic before application of the ink viscosity increasing component or ink. To make the print medium surface hydrophilic, it is possible to apply a surface active agent to the surface or to modify the surface by energy irradiation. The usable surface active agent is not limited. The following maybe preferably used: a common anionic surface active agent, a common cationic surface active agent, a common nonionic surface active agent, and a common amphoteric surface active agent, as well as a silicone-containing surface active agent and a fluorine-containing surface active agent. The energy irradiating means may be any common means such as ultraviolet irradiation, frame treatment, corona discharge treatment, or plasma treatment which allows the print medium surface to be made hydrophilic.

The thus selected materials and means are used to eject ink in accordance with two-dimensional image data obtained by divisively slicing a three-dimensional object containing desired three-dimensional images in the height direction, to create a two-dimensional print image on the print medium. This is repeated to create a predetermined number of print media according to the resolution in the height direction.

Stacking Step

The stacking step fixedly stacks the print media on which the slice images are printed in the printing step.

Basically, once the ink on the print media is dried, the print media are stacked. If a slice image is formed in each of plural medium chips in one print medium as shown in FIG. 3, the print medium is cut into the medium chips, which are then stacked. At this time, since stacking of the plural medium chips requires surfaces (reference surfaces) serving as a reference, care must be taken so as to accurately form reference surfaces. Subsequently, the print media are stacked in order of the slice images while aligning the reference surfaces of the print medium chips obtained by cutting. At this time, the chips are stacked while being bonded together via the bonding layers 72. To facilitate alignment of the medium chips, it is desirable to use a dedicated jig such that the reference surfaces of the medium chips can be abutted against the jig.

Although bonding is intentionally avoided when the print medium is sufficiently thick or only a small number of print media are stacked, the print media are desirably stacked while being fixed by bonding. The basic means for adhesive fixation is a bonding layer comprising an adhesive coated on the front or back surface of the print medium. In particular, with an adhesive pre-coated on the back surface of the print medium, the print media can be easily and conveniently bonded and fixed simply by laying the print medium surfaces from which the separator has been released, on top of one another as described with reference to FIG. 17A and 17B. The adhesive used is preferably highly transparent. For example, a urethane-containing material, an acrylic-containing material, or a silicone-containing material is preferably used as the adhesive.

A process of increasing bonding strength can be performed after stacking the print media. For example, bonding strength can be increased by heating the stacked print media using heating means such as a dryer. Alternatively, the adhesive can be injected into the gap between the print media under a capillary force by using a dropper to apply the adhesive to a side of set of print media or immersing the print media in the adhesive. The light refractive index of the adhesive desirably matches that of the print medium. For example, when the print medium is a PVA film, the adhesive is water. When the print medium is an acrylic resin, the adhesive is a methylene dichloride.

If the print medium is a water-soluble material (this means that the print medium is dissolved in an ink component or swells on exposure to the ink component), the print media can be adhesively stacked by stacking them before the ink on them is dried up. For example, print media containing PVA can be easily stacked because they readily absorb moisture from the ink and are adhesive.

Apiece of work comprising a three-dimensional object contained in a transparent sphere can be created by intentionally continuously varying the size or shape of the print media.

Figure 13A:
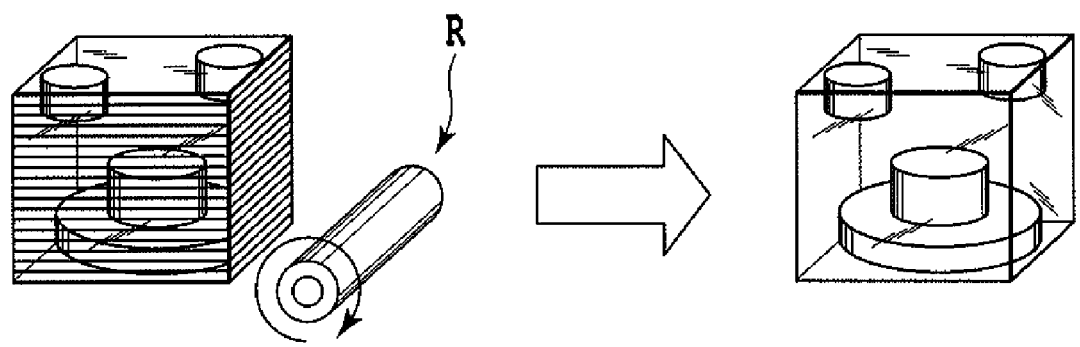
FIG. 13A and 13B is a diagram showing a transparency increasing process executed on sides of a three-dimensional object.

Moreover, in the present embodiment, as shown in FIG. 13A, a process (transparency increasing process) can be executed which improves the transparency of side of a three-dimensional object. That is, sides of a three dimensional object formed simply by stacking print media have relatively noticeable recesses and protrusions and are thus insufficiently smooth. The insufficiently smooth sides result in insufficient visibility through the sides. Thus, the visibility through the sides is preferably improved not only by stacking two-dimensional images but also by smoothing the sides of the three-dimensional object obtained by stacking the print media, to improve transparency.

One means for smoothing the sides polishes the sides, for example, as shown in FIG. 13A. A polishing roller is used to polish the sides of the three-dimensional object to improve the smoothness and thus transparency of the sides. The polishing roller preferably has a material such as a commercially available polish sheet wound around the body. Preferably, the polishing roller is also installed in the manufacturing apparatus in FIG. 15 and moved to a position where it can abut against a side of the three-dimensional object for polishing. After polishing, the polishing roller is separated from the side.

Figure 13B:
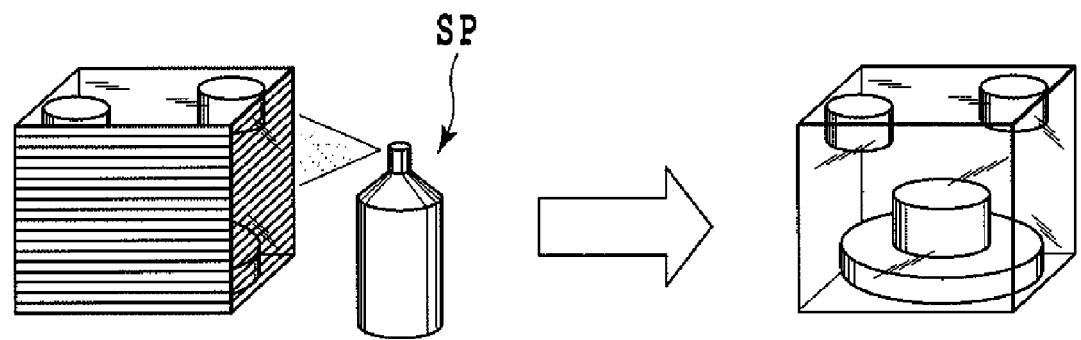

Another means for smoothing the side, for example, applies a transparent material to the side as shown in FIG. 13B. The method for applying the transparent material is not particularly limited. However, a spray method is preferable which can uniformly apply the transparent material to the entire side. Applying the transparent material to the side smoothes the recesses and protrusions on the side to improve the transparency of the side. The transparent material is not particularly limited as long as it is as transparent as the material of the print medium. For example, if the material of the print medium is acrylic, the transparent material is preferably, for example, acrylic clear lacquer.

The transparency is a value measured according to the "method for testing the optical characteristics of plastics" described in JIS-K7105. Accordingly, the "transparency increasing process" refers to a process of increasing a value measured by this measuring method. That is, if a value measured before a side treatment is larger than that measured after the side treatment, this side treatment corresponds to the "transparency increasing process" according to the present invention.

SPECIFIC EXAMPLES

Now, the present invention will be more specifically described with reference to specific examples and comparative examples of the present invention. In the description below, "pts." and "%" are in terms of the mass unless otherwise specified.

Specific Example 1

Description will be given below of each step of a method for forming a three-dimensional object according to Specific Example 1.

A: Printing Step

The printing step uses an ink jet printing apparatus to form slice images of a three-dimensional object on a print medium.

First, a PET (polyethylene terephthalate) film of thickness 80 μm was used as a base material for a print medium. The both surfaces of the PET film was then modified using an atmospheric-pressure plasma irradiation apparatus (ST-7000 manufactured by KEYENCE CORPORATION) under the following conditions.

Irradiation distance: 5 mm
Plasma mode: High
treatment speed: 100 mm/sec

A commercially available solvent adhesive (BPS-5127 manufactured by TOYO INK MFG CO., LTD) was coated on one of the modified surfaces so as to have a thickness of 30 μm after drying. Subsequently, a PET film of thickness 150 μm on which a thin layer of a releasing paper releasing agent (KS779H manufactured by Shin-Etsu Chemical Co., Ltd.) is coated is laminated to the pressure sensitive adhesive surface as a separator (releasing layer).

A dried ink receiving layer material is coated on the other surface of the print medium base material using a bar coater; the ink receiving layer material is prescribed as follows.

Polyvinyl alcohol (PVA102 manufactured by KURARAY CO., LTD.) 30 pts.
Polyvinyl pyrrolidone (K=90 manufactured by GAF; molecular weight: 360,000): 15 pts.
Pure water: 55 pts.

Then, a cut machine was used to cut the print medium into chips of 200 mm×280 mm. Longitudinal and lateral slits were then made in the layers (ink receiving layer, base material, and adhesive layer) on the separator at intervals of 20 mm. This completed a print medium having 140 20 mm×20 mm print medium chips arranged on one separator 7a.

Then, a commercially available ink jet printing apparatus (PIXUS950i manufactured by the applicant) was used to print two-dimensional images into which the three-dimensional object has been sliced. In this case, three-dimensional image data containing a three-dimensional image of "fireworks" was printed on the print medium chips of the print medium in accordance with two-dimensional image data obtained by slicing the print medium at increments of a fixed thickness in the height direction.

B: Stacking Step

The stacking step fixedly stacks the print media on which the slice images are printed in the printing step.

The print medium chips on which the slice two-dimensional images are printed are released from the separator and stacked in order. Since the adhesive is coated on the back surfaces of the print medium chips, the print medium chips can be fixedly stacked under pressure. At this time, if the user manually performs the operation, the user should wear gloves or the like so as to prevent the chip surfaces from being contaminated with fingerprints or the like. Alternatively, the chips can be stacked via a full automatic scheme utilizing machinery. In this case, releasing means, a stacking section, and removing means may be installed in the apparatus; the releasing means releases the chips from the separator, the stacking section stacks the released chips, and the removing means removes the three-dimensional object comprising the stacked chips, from the stacking section.

Figure 5:
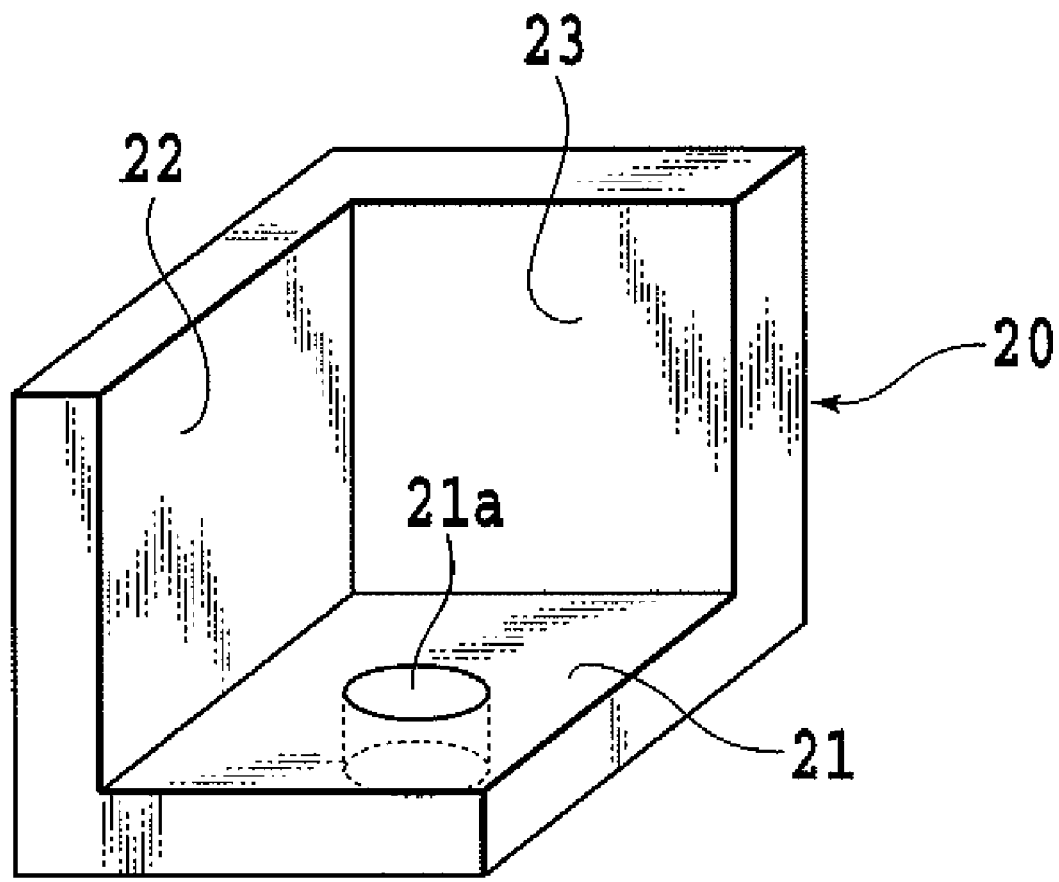
FIG. 5 is a perspective view showing a jig used in a specific example 1 of the present invention.

In this stacking operation, for example, a jig 20 such as the one shown in FIG. 5 can be used to accurately and easily stack print medium chips 9. The jig 20 comprises a rectangular bottom surface 21 and two sides rising upward from two adjacent sides of the bottom surface. The surfaces 21, 22, and 23 of the jig 20 are orthogonal to one another. The sides 22 and 23 constitute reference surfaces for stacking of the print medium chips 9.

The operation of stacking the print medium chips will be described step by step with reference to FIGS. 6A to 6D.

Figure 6A:
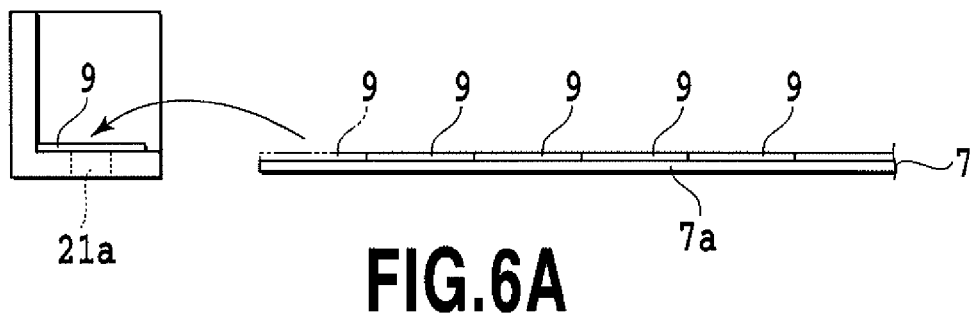
FIGS. 6A to 6D are side views illustrating a stacking step in the specific example 1 of the present invention.

In the operation, the plurality of medium chips 9 arranged on a base film 7a are released from the separator 7a in the order reverse to that of slicing. The released print medium chips 9 are stacked on the bottom surface 21 of the jig 20. FIG. 6A shows that the print medium chip 9 on which the corresponding slice image is formed is released from the separator 7a and that the surface of the print medium chip 9 having contacted the separator 7a is stuck to the bottom surface of the jig 2 under pressure. At this time, the two adjacent end surfaces 21 and 22 of the print medium chip 9 serve as reference surfaces. These reference surfaces are abutted against the respective sides (reference surfaces) of the jig to position the print medium chip 9.

Figure 6B:
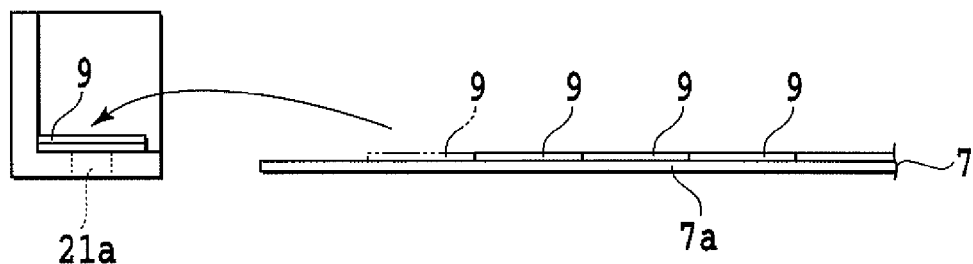
Figure 6C:
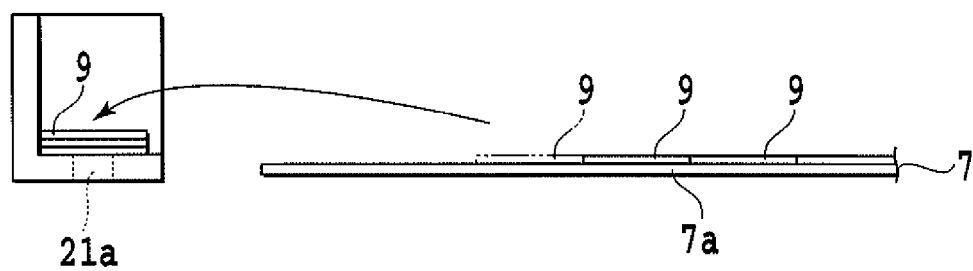
Figure 6D:
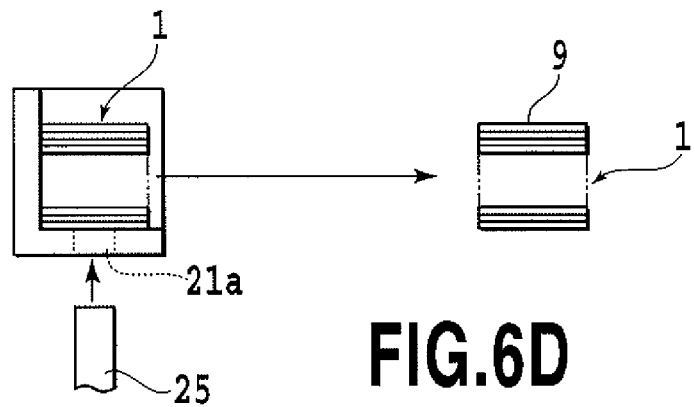

Then, as shown in FIG. 6B, the print medium chip 9 on which the second slice two-dimensional image from the last is formed is released from the separator 7a. This print medium chip 9 is placed on and pressed against the top surface of the print medium chip 9 already stuck to the jig 20. FIG. 6C shows that the print medium chip 9 on which the third slice two-dimensional image from the last is formed is similarly stacked.

The print medium chips are thus sequentially stacked in the order reverse to that of slicing to form a three-dimensional object 1 such as the one shown in FIG. 6B. The three-dimensional object 1 is configured so that three layers, the bonding layer, base material, and ink receiving layer, are repeated in this order from the bottom layer. Subsequently, a stick 25 is inserted through a through-hole 21a formed in the bottom surface to push up the three-dimensional object. The three-dimensional object 1 is thus removed from the jig 20.

In the above stacking step, stacking 140 print medium chips resulted in a rectangular parallelepiped-shaped three-dimensional object 1 of 20 mm×20 mm and depth about 25 mm. The following process liquid is coated on a stacking side of the three-dimensional object 1 with a writing brush. Alternatively, the process liquid may be sprayed onto the side. After the process liquid is dried, the side of the three-dimensional object 1 is smoothed by pressing it against an iron (low temperature) having a base surface subjected to non-adhesive coating.

The following process liquid was used.
Polyvinyl alcohol (PVA102 manufactured by KURARAY CO., LTD.) 10 pts.
Pure water: 90 pts.

The above step successfully resulted in a three-dimensional object containing a three-dimensional image of "fireworks".

Specific Example 2

The printing step uses an ink jet printing apparatus to form slice images of a three-dimensional object on a print medium.

First, a PET (Poly Ethylene Terephthalate) film of thickness 100 μm was used as a base material for the print medium. One surface of the PET film was modified into a surface of a transfer member using an atmospheric pressure plasma irradiation apparatus (Plasma Atom Handy manufactured by NIPPON PAINT Co., Ltd.) under the following conditions.
Irradiation distance: contact
Plasma mode: standard
Treatment speed: 10 mm/sec Then, 0.3 mg/m$^2$ of process liquid was coated on the surface of the base material using a roll coater; the process liquid was obtained by adding 0.5% of fluorine-containing surface active agent (Surflon S-141 manufactured by SEIMI CHEMICAL Co., Ltd.), serving as an ink viscosity increasing component, to a 10 mass % water solution of calcium chloride 2 hydrate.

Thus, a print medium is obtained which has the base material and the ink receiving layer that becomes adhesive on contact with the ink.

Then, the cut machine was used to cut the print medium into chips of size 50 mm×50 mm. Sheet-like print medium chips were thus obtained.

Then, an ink jet printing apparatus (nozzle density: 1,200 dpi, ejection amount: 4 pl, driving frequency: 8 kHz) and 5 color inks were used to form a two-dimensional print image on the print medium on the surface on which the ink viscosity increasing component was coated, in accordance with image data obtained by slicing three-dimensional image data on a "fountain" in the height direction. In this case, the ink used had the following composition.
The following pigments: 5 pts
Black: carbon black (MCF88 manufactured by MITSUBISHI CHEMICAL CORPORATION)
Cyan: pigment blue 15
Magenta: pigment red 7
Yellow: pigment yellow 74
White: titanium oxide
  Styrene-acrylic acid-copolymer of acrylic acid and ethyl (acid value: 240, average molecular weight: 5,000): 1 part
  Glycerin: 10 pts.
  Ethylene glycol: 5 pts.
  Surface active agent (Acetyron manufactured by Kawaken Fine Chemicals Co., Ltd.): 1 part
  Ion-exchanged water: 78 pts.
B: Stacking Step The stacking step fixedly stacks the print media on which the slice images are printed in the printing step.

Once the ink on the print medium on which the slice two-dimensional images are printed is appropriately dried with the surface of each chip starting to become adhesive, the chips are stacked in order. Specifically, the print media are sequentially stacked while being bonded together via the ink receiving layers having become adhesive. Once the stacking is completed, a photosensitive resin adhesive is supplied to the print media through a side of set of stacked print media using a dropper. The photosensitive resin adhesive is filled into the gaps among the stacked print media under a capillary force. The photosensitive resin adhesive used had the following composition.
Photosensitive resin (ARONIX M120 manufactured by TOAGOSEI CO., LTD.): 95 pts.
Photopolymerization initiator (Irugacure 184 manufactured by Chiba Specialty Chemical): 5 pts.

The photosensitive resin is subsequently irradiated with ultraviolet rays and hardened. Sides of the photosensitive resin are then polished. The above step successfully resulted in a three-dimensional object containing a three-dimensional image of a "fountain".

As described above, the present embodiment manufactures a three-dimensional object simply by stacking division media (chips) into which a print medium is divided. This makes it possible to manufacture an easy-to-handle three-dimensional object of a safe and inexpensive configuration. The present embodiment also enables a three-dimensional object to be fully automatically manufactured.

Second Embodiment

Now, a second embodiment of the present invention will be described in detail.

Figure 7:
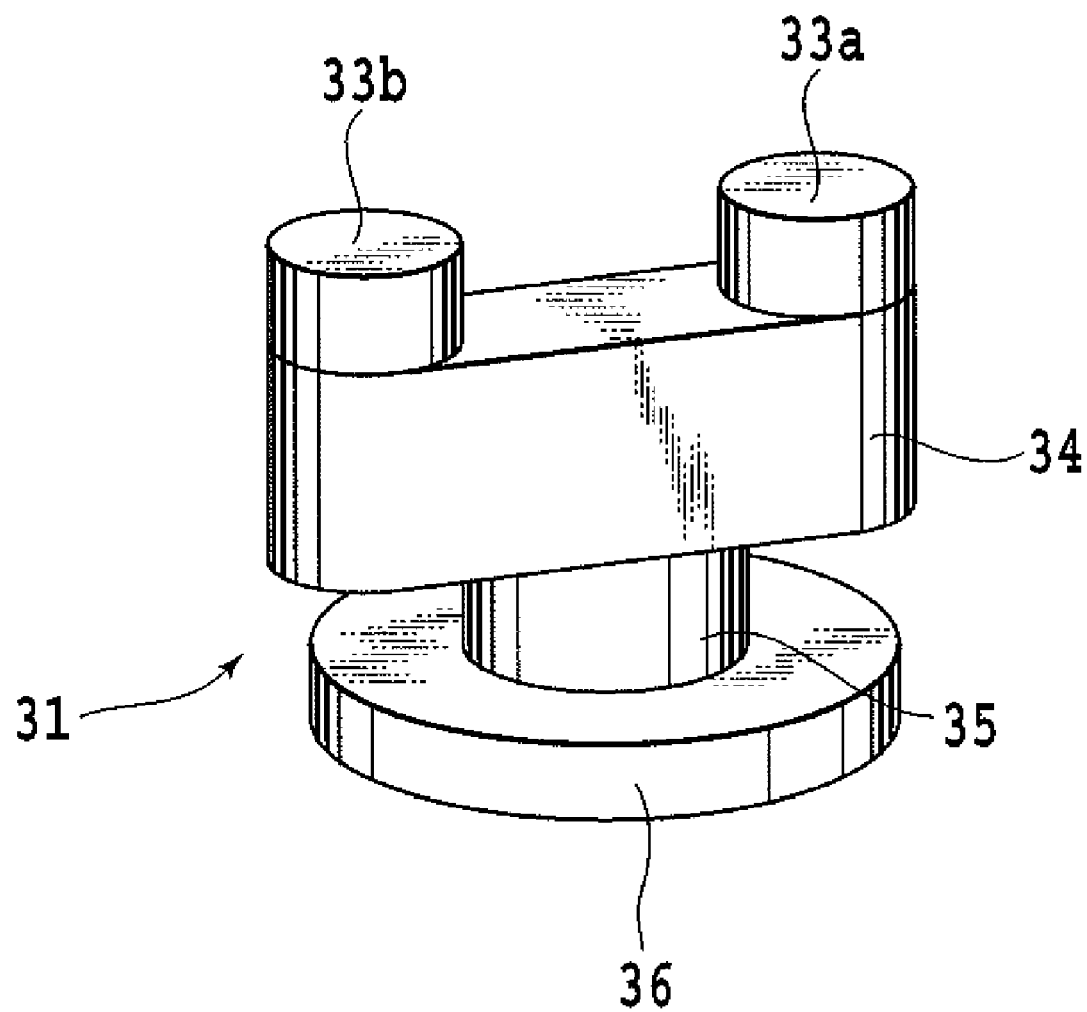
FIG. 7 is a perspective view showing a three-dimensional object formed according to the embodiment of the present invention.

FIG. 7 shows an example of a three-dimensional object formed according to the embodiment of the present invention. FIGS. 8 to 11 and 12A to 12C show schematic diagrams of a method for forming a three-dimensional object according to the present invention.

The present embodiment has a printing step (first step) of forming a two-dimensional image on a sheet-like print medium, a stacking step (second step) of stacking division print media on which the two-dimensional image is formed, and a removing step (third step) of removing a non-image-printed part. These steps result in, for example, a three-dimensional object 1 comprising a plurality of colored components (for example, 33a, 33b, 34, 35, and 36) such as those shown in FIG. 7.

Now, a process for manufacturing the three-dimensional object 1 shown in FIG. 7 will be described with reference to FIGS. 8 to 11 and 12A to 12C.

First, printing step in the present embodiment will be described.

Figure 8:
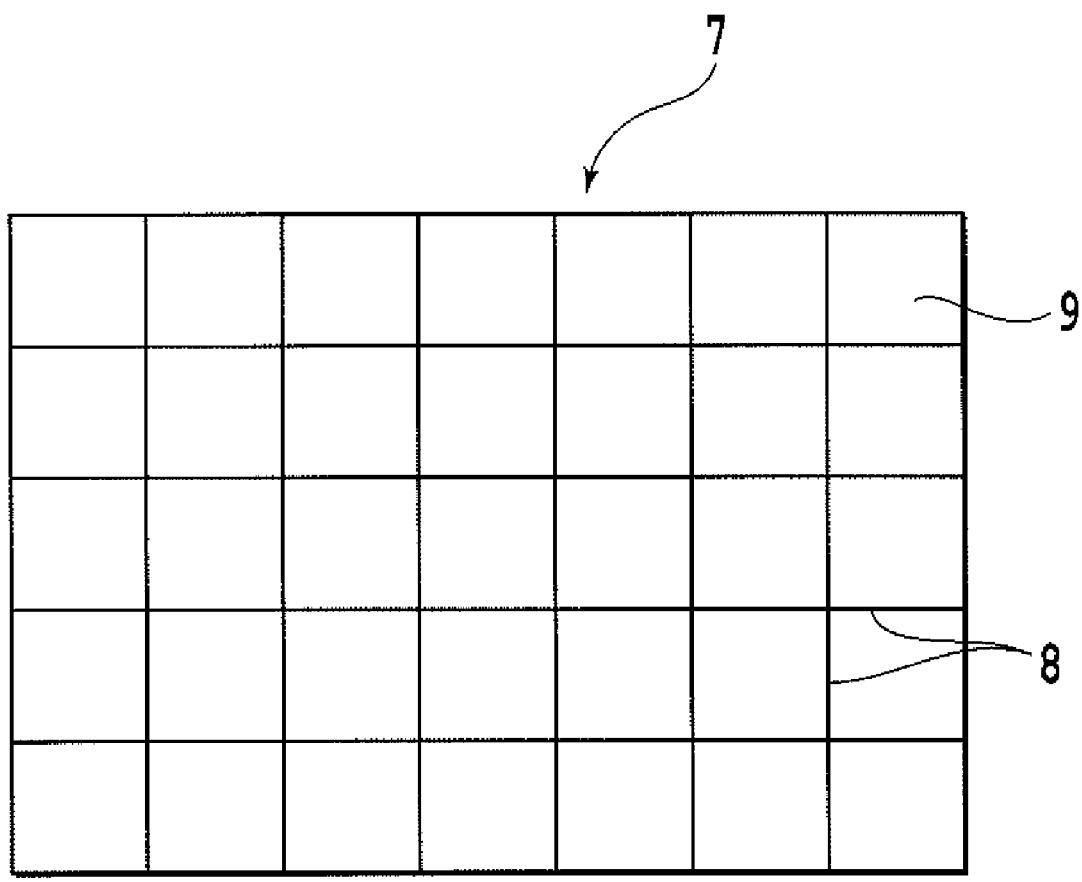
FIG. 8 is a plan view showing an example of a sheet-like print medium that is usable according to an embodiment of the present invention.

FIG. 8 shows an example of a sheet-like print medium 37 that is usable in a printing step according to the present embodiment. The print medium 37 has the layer configuration shown in FIG. 17A and 17B, that is, comprises an ink receiving layer composed of a water-soluble, ink coloring material and a bonding layer. The print medium 37 has a plurality of rectangular areas (print medium chips) 39 of a fixed size enclosed by longitudinal and lateral cut grooves 38.

Figure 9:
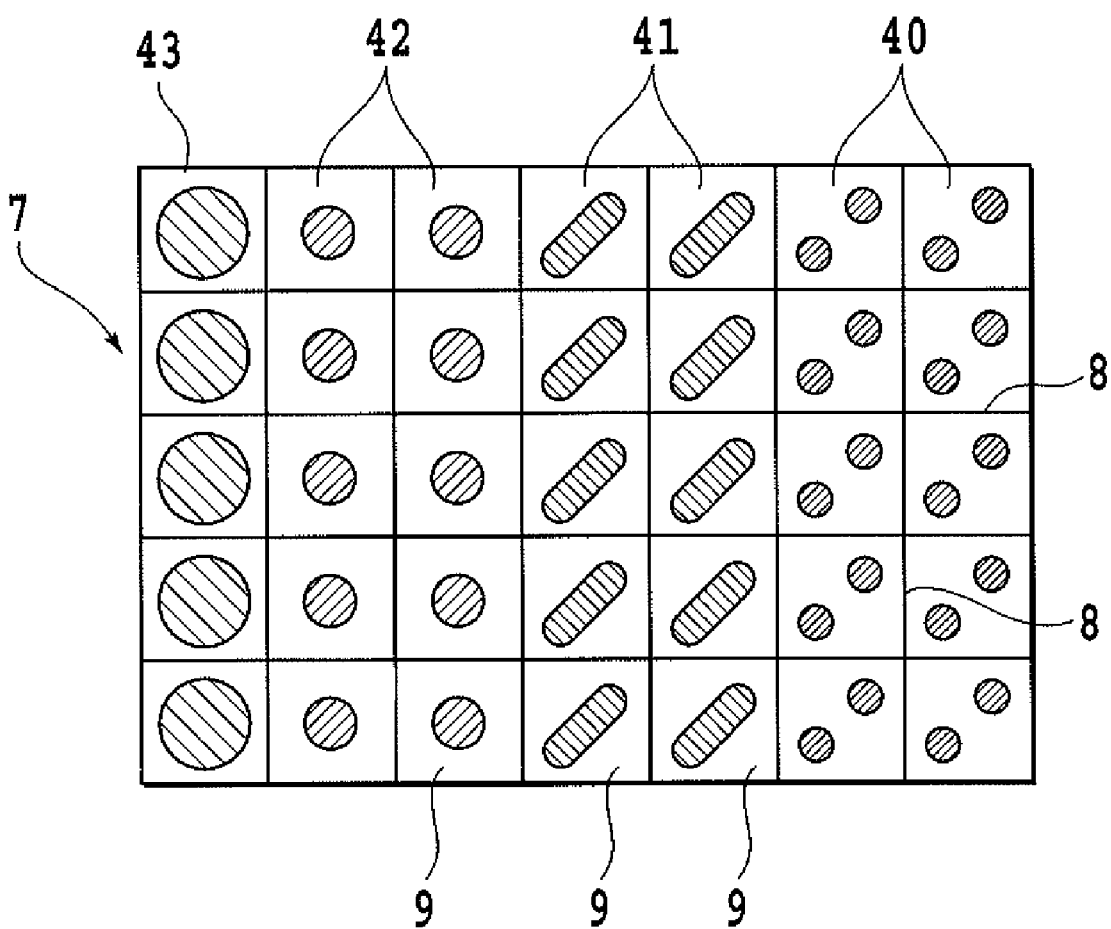
FIG. 9 is a plan view showing that a two-dimensional print image is formed on the print medium shown in FIG. 2, in a printing step according to the embodiment of the present invention.

FIG. 9 shows that a two-dimensional print image is formed on the print medium 7 shown in FIG. 8 using the ink jet printing apparatus. As shown in the figure, two-dimensional images into which the three-dimensional object 31 shown in FIG. 7 is divisively sliced at increments of a fixed height are each formed on one of print medium chips 39 of the print medium 7;. For example, slicing the three-dimensional object 31 shown in FIG. 7 sequentially downward along horizontal surfaces results in two-dimensional images 40, 41, 42, and 43 on the print media chips 39. Reference numeral 40 denotes two-dimensional images including slice images of the components 33a and 33b of the three-dimensional object 31. Reference numeral 41 denotes two-dimensional images including slice images of the component 34. Reference numeral 42 denotes two-dimensional images including slice images of the component 35. Reference numeral 43 denotes two-dimensional images including slice images of the component 36.

Print data on the two-dimensional image printed on each medium chip 9 is sectional data obtained by slicing three-dimensional data expressing the three-dimensional object 31 to be formed, at increments of a fixed thickness along a two-dimensional direction. Consequently, the number of required medium chips 39 on which two-dimensional images are printed is the same as that of the slice data. Here, two-dimensional image data is obtained by slicing three-dimensional data at increments of thickness of the print medium 37 used. Three-dimensional image data can be created by three-dimensional CAD modeling software. The three-dimensional image data may be shape data and texture obtained by measuring the three-dimensional object using a three-dimensional input apparatus.

Figure 10:
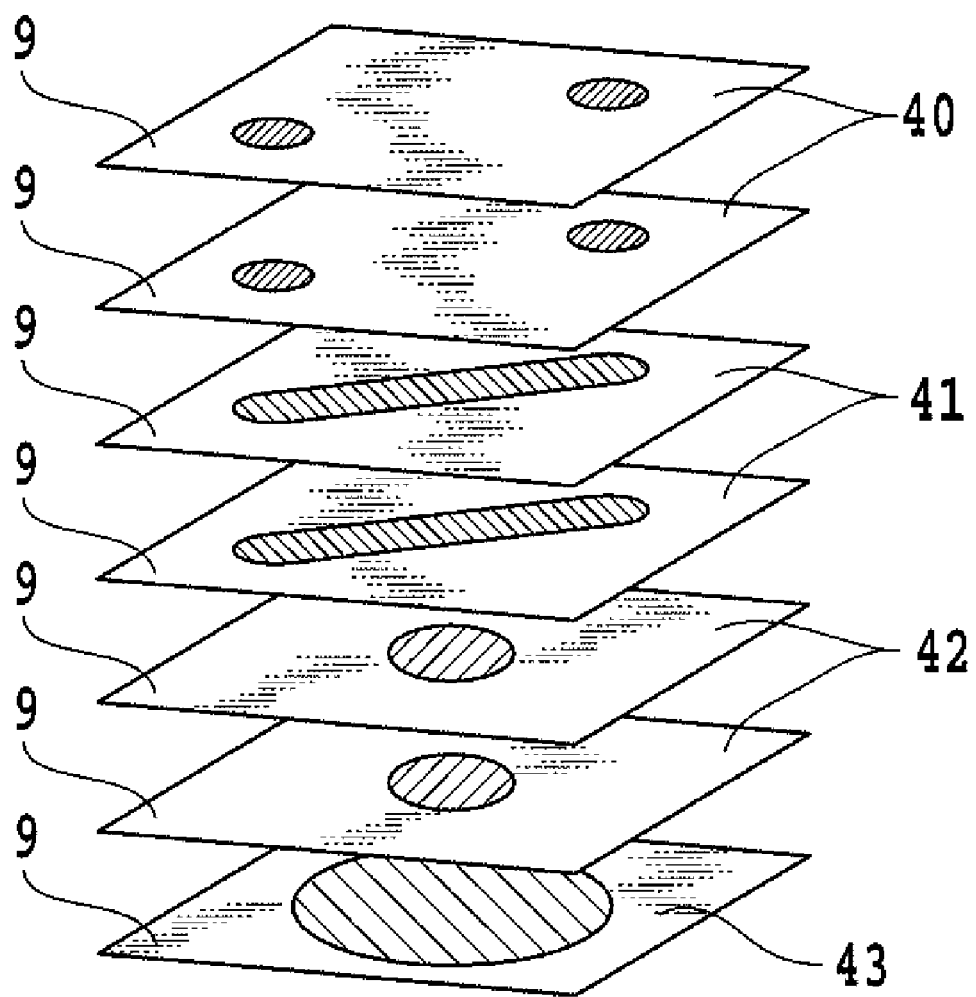
FIG. 10 is a perspective view schematically showing that print medium chips are stacked in a stacking step according to the embodiment of the present invention.

FIG. 10 shows a stacking step of stacking the two-dimensional print images formed in the printing step. Here, as shown in FIG. 9, the plurality of print medium chips 39 on which the two-dimensional images are printed are sequentially stacked in order of the slice images. This forms a rectangular parallelepiped-shaped stack 45 such as the one shown in FIG. 11. The stack 45 contains the three-dimensional image 31.

Then, in the removing step, a non-image-printed portion (soluble portion) 44 of the stack 45 which is formed around the periphery of the three-dimensional object 31 is removed by solving it with, for example, water. The three-dimensional object 31 is then removed. The process for forming the three-dimensional object 31 is thus completed.

The method for creating a three-dimensional object which method is configured as described eliminates large-scale facilities and enables the use of a commercially available ink jet printing apparatus. Thus, this method can easily create an original three-dimensional object using a low-cost apparatus. Further, the three-dimensional object 31 is contained in the transparent portion 44, enabling the reproduction of the three-dimensional object 31 of an overhung shape. Varying the color of ink ejected from the ink jet printing apparatus enables simultaneous coloring.

Now, the printing step, stacking step, and removing step will be described in further detail with reference to members and devices used in implementing these steps.

1. Printing Step

The printing step forms a two-dimensional image on a print medium using the ink jet printing apparatus. The ink receiving layer used in this step needs to be characterized in that it is soluble by itself, whereas ink adhering portions are insoluble. The material for the ink receiving layer is thus determined by a combination with the ink. That is, the simplest method involves forming an image on a porous water-soluble film with oily ink and washing the film with water to remove the non-image-printed part. However, aqueous ink is now favored in terms of the easiness with which it is handled and environmental hygiene. Accordingly, insolubilizing reaction based on a water-soluble resin and a crosslinking agent is preferably utilized.

In this case, the following three combinations are available. The term reactivity used below includes the case in which the material is partly reactive. That is, a resin comprising a non-reactive resin and a reactive resin is shown as a reactive resin.
1) Print medium: water-soluble resin (non-reactive)
Ink: water-soluble resin (reactive)+crosslinking agent
2) Print medium: water-soluble resin (reactive)
Ink: crosslinking agent
3) Print medium: water-soluble resin (non-reactive)+crosslinking agent
Ink: water-soluble resin (reactive)
4) Print medium: water-soluble resin (reactive)
Ink: water-soluble resin (reactive)+crosslinking agent In this case, various reactions can be utilized. Examples of preferable crosslinking reactions include carboxylic acid+metal ions, carboxylic acid+epoxy, epoxy +amine, carboxylic acid+aridilin, carboxylic acid+oxazoline, and carboxylic acid+carbodiimide.

A preferable water-soluble resin has an average molecular weight of about 1,000 to 15,000. Specific examples of the preferable water-soluble resin include synthetic polymers such as a vinyl-containing water-soluble resin, styrene and its derivative, vinyl naphthalene and its derivative, aliphatic alcohol ester of $\alpha$, $\beta$-ethylene unsaturated carboxylic acid, and acrylic acid and its derivative. Specific examples also include a block copolymer or random copolymer comprising maleic acid and its derivative, itaconic acid and its derivative, or fumaric acid and its derivative. Specific examples further include salts of the above polymers, natural polymers including animal-origin polymers such as gelatin, polysaccharide polymers such as starch, and microorganism-origin polymers such as dextrin, and semi-synthetic polymers including a cellulose resin and an alginic acid-containing resin.

Other available reactions use a color material contained in the ink. For example, it is possible to use an anion-cation reaction utilizing the anionicity of dyes or a reaction involving aggregation of particulate-containing ink such as pigment ink with a polymer aggregating agent or metal ions, or a combination of these reactions.

Alternatively, the print medium used for the present embodiment may contain colorless fine powder added to the above material as a filler.

Alternatively, the ink receiving layer may comprise a thermosetting resin. For example, with a PVA film, moisture can be left inside print media by stacking them before ink adhering portions are dried up. Applying an electromagnetic wave such as a microwave to the print media makes only the ink adhering portions hot to crystallize and insolubilize them. Owing to its film-like structure and high workability, the print medium according to the present embodiment can be hardened after stacking using a home-use microwave oven. Similarly, the electromagnetic wave may be an RF wave (high frequency). In this case, heat generation can be controlled by adjusting a conductive material in the ink.

The thickness of the ink receiving layer has a certain effect on the resolution of a three-dimensional object in its height direction and is thus selected as required. The thickness of the ink receiving layer also has a certain effect on the ink absorption amount and is thus used to adjust the ink application amount. Accordingly, to achieve a high resolution in the height direction, it is necessary to use a thinner print medium and a reduced amount of ink applied. Creation of a high-resolution three-dimensional object requires more print media and a larger amount of data than creation of a low-resolution three-dimensional object.

The ink used is selected taking the reactivity of the print medium into account as previously described. It is possible to use aqueous or oily (solvent-containing) ink having a dye or pigment commonly used as an ink color material and a solvent that solves and/or disperses the dye or pigment. In particular, the aqueous ink is preferably used in terms of safety and environmental problems. Accordingly, the description below centers on the aqueous ink. The color material can be effectively selected taking transparency into account.

The dye and pigment used may be, for example, similar to those in the first embodiment.

The compounding ratio of the compositions constituting the ink is also not limited and may be properly adjusted within a possible ejection range based on the ejecting force of the print head of the ink jet printing apparatus, nozzle diameter, or the like. In general, in terms of mass, the ink contains 0.1 to 10% of color material, 5 to 40% of solvent, and at most 0.01 to 5% of surface active agent, with the remaining amount adjusted with pure water.

The thus selected materials and means are used to eject ink in accordance with two-dimensional image data obtained by divisively slicing a desired three-dimensional object in the height direction, to create a two-dimensional print image on the print medium. This is repeated to create a predetermined number of print media according to the resolution in the height direction.

Stacking Step

The stacking step fixedly stacks the print media on which the slice images are printed in the printing step.

If the ink receiving layer is also used as a bonding layer, once the ink on the print media is dried to some degree, the print media are stacked. This enables the print media to be sequentially stacked while being bonded together via the ink receiving layers having become adhesive. Completely drying the ink makes the stacked sheets completely non-adhesive. However, the low volatility of some types of organic solvent contained in the ink makes the print media likely to remain adhesive, suppressing improper adhesion. On the contrary, insufficient drying may spread the ink during stacking to disturb the image. However, in this case, the ink absorbing capability of the print media back surface substantially prevents the image from being disturbed.

Further, if a slice image is formed on each of plural print medium chips in one print medium as shown in FIG. 9, the print medium is cut into print medium chips, which are then stacked. At this time, since stacking of the plural medium chips requires surfaces (reference surfaces) serving as a reference, care must be taken so as to accurately form reference surfaces. Subsequently, the print media are stacked in order of the slice images while aligning the reference surfaces of the print medium chips obtained by cutting. To facilitate alignment of the medium chips, it is desirable to use a dedicated jig such as the one described in the first embodiment to abut the reference surfaces of the medium chips against the jig.

Removing Step

Figure 11:
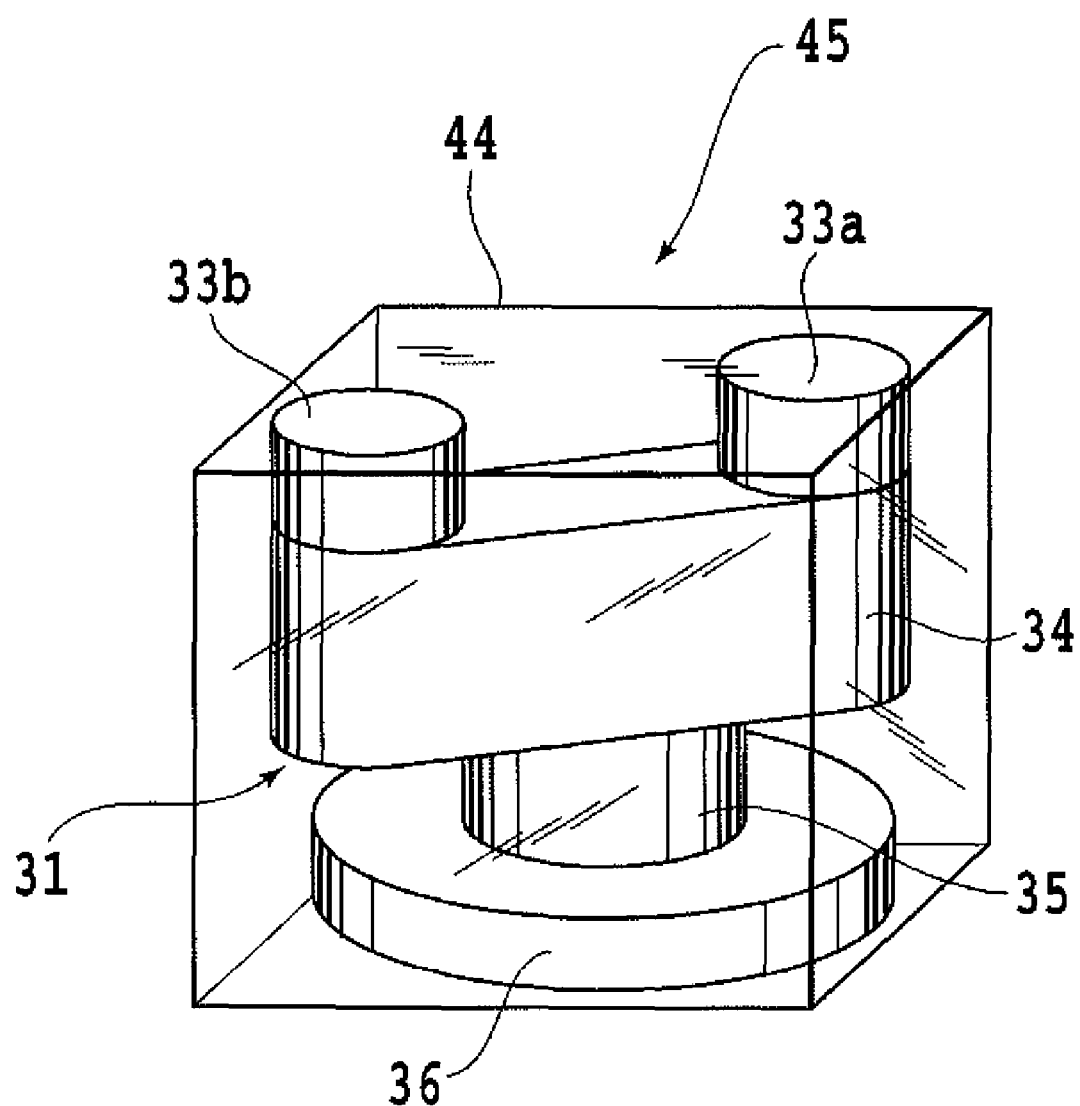
FIG. 11 is a perspective view showing a stack formed according to the embodiment of the present invention.

The removing step removes the non-image-formed part from the stack 45, shown in FIG. 11. That is, after all the print media or print medium chips are stacked, the stacked state is held for a while to immobilize the resin. To reduce the time for immobilization, a dryer or the like may be used to heat the print medium chips. However, too high a temperature may make it difficult to remove the non-image part. Consequently, moderate heating needs to be provided.

Once the resin is immobilized, the stack 45 is washed with water. The non-image part is water soluble and is thus removed. However, the image formed part is insolubilized by the reaction of the ink and is not removed. This allows only the image formed part to remain to provide a desired three-dimensional object.

Coating a transparent lacquer or on the surface of the three-dimensional object thus created further improves the finish.

Specific Examples

Now, the present invention will be more specifically described with reference to specific examples and comparative examples. In the description below, "pts." and "%" are in terms of the mass unless otherwise specified.

Specific Example 3

Description will be given below of each step of a method for forming a three-dimensional object according to Specific Example 3.

A: Printing Step

The printing step uses an ink jet printing apparatus to form slice images (two-dimensional images) of a three-dimensional object on a print medium.

First, a PET (polyethylene terephthalate) film of thickness 100 μm was used as a print medium separator. The coating liquid described below was coated on the surface of the PET film to a dry film thickness of 100 μm. The PET film was then dried to form an ink receiving layer.

Formulation of the Coating Liquid

Polyvinyl alcohol, PVA102 manufactured by KURARAY Co., Ltd.: 20 pts.

Bezalconium chloride, G50 manufactured by SANYO KASEI CO., LTD.: 1 part

Polyallylamine hydrochloride, PAA-HCL-L manufactured by Nitto Boseki Co., Ltd.: 2 pts.

Surface active agent, Surfinol 465 manufactured by Shin-Etsu Chemical Co., Ltd.: 1 part Pure water: 76 pts.

Then, the cut machine was used to cut the print medium into chips of 200 mm×280 mm. Longitudinal and lateral slits were then made in the ink receiving layer on the separator at intervals of 20 mm. This completed a print medium having 140 20 mm×20 mm print medium chips arranged on one separator.

Then, the commercially available ink jet printing apparatus (PIXUS950i manufactured by the applicant) was used to print two-dimensional images into which the three-dimensional object has been sliced. In this case, three-dimensional image data on a "Christmas tree" was printed on the print medium chips of the print medium in accordance with two-dimensional image data obtained by slicing the print medium at increments of thickness of the print medium in the longitudinal direction. At this time, in addition to the two-dimensional image of the three-dimensional object, alignment cross marks were printed in the four corners of all the print medium chips. Specific Example 3 used two print media.

B: Stacking Step

The stacking step fixedly stacks the print media on which the slice images are printed in the printing step. In this case, the print media are sequentially stacked while being bonded together via the ink receiving layers that become adhesive on contact with the ink.

Figure 12A:
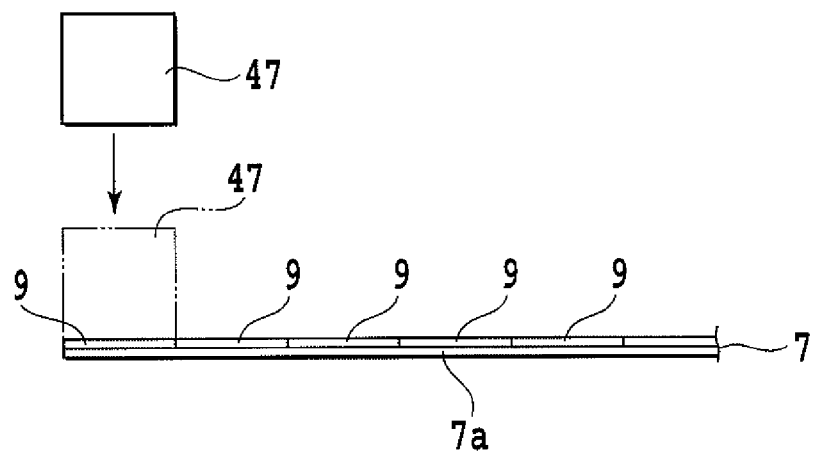
FIGS. 12A to 12C are perspective view showing a stacking step in a specific example of the present invention.
Figure 12B:
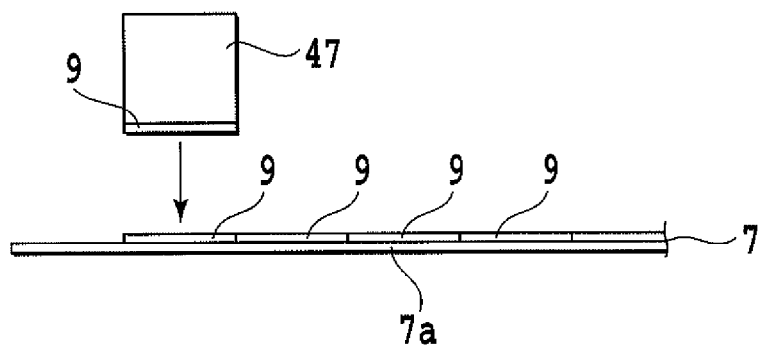
Figure 12C:
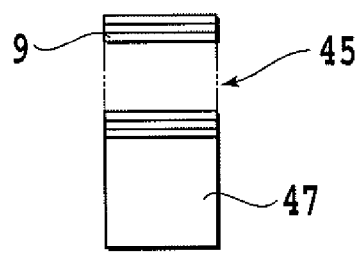

The stacking operation can be efficiently performed using a stacking mount 47 such as the one shown in FIGS. 12A to 12C. The stacking mount 47 is formed of a transparent acrylic material. In this case, the stacking mount 47 is shaped like a cube 20 mm square. The print medium chips 39 on which the slice two-dimensional images are printed in the printing step are stacked on the bottom surface of the stacking mount 47 in order of the slicing.

First, the bottom surface of the stacking mount 47 is wetted with an atomizer or the like. Subsequently, as shown by an alternate long and short dash line in FIG. 12A, the bottom surface of the stacking mount 47 is pressed against the surface of the print medium chip 39 so that the surfaces are in tight contact with each other. Droplets adhering to the stacking mount come into contact with the ink receiving layer to dissolve the surface of the ink receiving layer to make it adhesive. The stacking mount 47 is then moved upward to release the medium chip 9 from the separator 7a of the print medium 7. The medium chip 9 thus moves to the bottom surface of the stacking mount 47. Then, the surface (which contacted the separator 37) of the print medium chip which adheres to the stacking mount 47 is slightly wetted with the atomizer. Then, the stacking mount 47 is carefully pressed against the next print medium chip 47 from above so that the cross marks on the print medium chip 39 adhering to the stacking mount 47 aligns with the cross marks formed on the next print medium chip 47 (see FIG. 12B). This operation is repeated to sequentially stack all the print medium chips to form a stack 45 (see FIG. 12C). Subsequently, the completed stack 45 is removed from the stacking mount 47. The stacking step is thus completed. No image is printed on the first print medium chip 39 stuck to the bottom surface of the stacking mount 47 so as to enable the stack 45 to be removed from the stacking mount 47 after the stack 45 has been completed.

C: Removing Step

The removing step removes a non-image-formed portion 44 from the stack 45 (see FIG. 11) to obtain a three-dimensional object 31.

To immobilize the resin in the stack 45, the dryer was used to send air to the stack 45 to heat it. Subsequently, the non-image part 44 was dissolved and removed with warm water at about 40° C. to obtain the three-dimensional object. Subsequently, the dryer was used to dry the three-dimensional object again to obtain a model of a "Christmas tree", the desired three-dimensional object.

Specific Example 4

A: Printing Step

The printing step uses the ink jet printing apparatus to form slice images of a three-dimensional object on a print medium.

First, a PET (polyethylene terephthalate) film of thickness 100 μm was used as a separator. The coating liquid described below was coated on the surface of the PET film to a dry film thickness of 200 μm. The PET film was then dried to form an ink receiving layer.

Formulation of the Coating Liquid
  Polyvinyl alcohol, PVA102 manufactured by KURARAY Co., Ltd.: 20 pts.
  Calcium chloride 2 hydrate, reagent: 2 pts.
  Crosslinking agent, CARBODILITE V02 manufactured by Nisshinbo Industries, Inc.: 1 part
    Surface active agent, Surflon S141 manufactured by SEIMI CHEMICAL Co., Ltd.: 0.5 part
    Pure water: 76.5 pts.

Then, the cut machine was used to cut the print medium into print medium chips of 200 mm×300 mm. Longitudinal and lateral slits were then made in the print medium layer on the base film at intervals of 40 mm×50 mm. This completed a print medium having 20 40 mm×50 mm print medium chips arranged on one releasing sheet.

Then, the ink jet printing apparatus and 6 color inks were used to form a two-dimensional print image on the print medium in accordance with image data obtained by slicing three-dimensional image data on a "single-family house" in the height direction. In this case, a print head with a nozzle density of 600 dpi and an ejection amount of 8 pl was used to carry out printing at a driving frequency 12 kHz. The ink used had the following composition.

The following pigments: 5 pts
Black: carbon black (MCF88 manufactured by MITSUBISHI CHEMICAL CORPORATION)
Cyan: pigment blue 15
Magenta: pigment red 7
Yellow: pigment yellow 74
White: titanium oxide
Transparent: Silica particulates (average particle size: 100 nm)
  Styrene-acrylic acid-copolymer of acrylic acid and ethyl (acid value: 200, average molecular weight: 4,700): 1 part
  Glycerin: 10 pts.
  Ethylene glycol: 5 pts.
  Surface active agent (Acetyrenol EH manufactured by Kawaken Fine Chemicals Co., Ltd.): 1 part
  Ion-exchanged water: 78 pts.

B: Stacking Step

The stacking step fixedly stacks the print media on which the slice images are printed in the printing step.

C: Removing Step

To immobilize the resin in the stack 45 as in the case of Specific Example 3, the dryer was used to send air to the stacked print media to heat them. Subsequently, the non-image part was dissolved and removed with warm water at about 40° C. to obtain the three-dimensional object. Subsequently, the dryer was used to dry the removed three-dimensional object again to obtain a model of a "single-family house", the desired three-dimensional object.

Third Embodiment

The first and second embodiments manufactures a three-dimensional object by forming a two-dimensional image into chips in accordance with two-dimensional image data obtained by dividing three-dimensional image data in the height direction, and stacking the chips on which the two-dimensional image is formed, in the height direction. However, the present invention is not limited to the form in which the chips are stacked in the height direction. The third embodiment is characterized by differing from the first and second embodiments in the three-dimensional-object slicing direction and the chip stacking direction. The third embodiment will be described below. However, the elements of the third embodiment other than its characteristic ones are similar to those of the first and second embodiments and will thus not be described.

Figure 14:
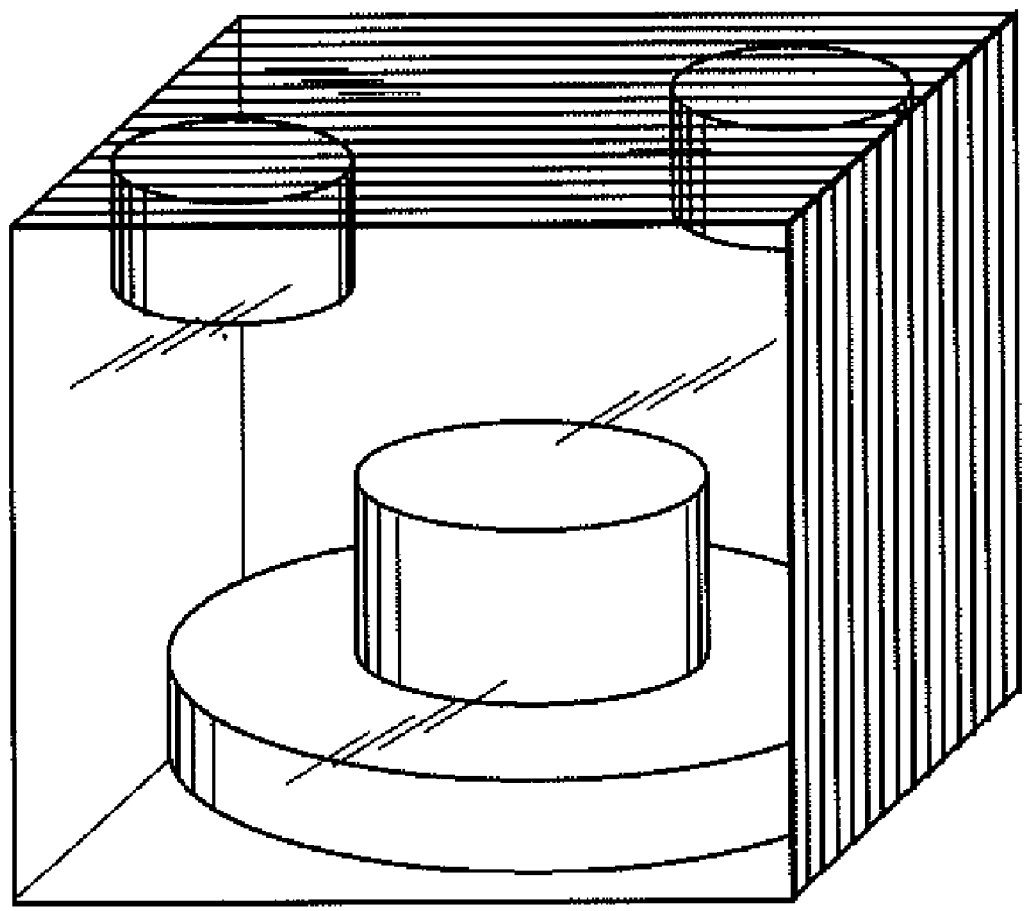
FIG. 14 is a diagram showing that chips are stacked in a depth direction to form a three-dimensional object.

As shown in FIG. 14, the third embodiment divides three-dimensional image data in a direction (for example, the depth direction or width direction) orthogonal to the height direction to acquire two-dimensional image data and stacks chips on which the two-dimensional image is formed, in the direction orthogonal to the height direction. A three-dimensional object formed by the stacking has a side constituting a stacking cross section and a side constituting a non-stacking cross section. The side constituting the non-stacking cross section has few recesses and protrusions and is very transparent. Therefore, the stacking according to the third embodiment is preferable in manufacturing a three-dimensional object (for example, an aquarium for tropical fish) for which the observability from one side is important.

Like the first and second embodiments, the third embodiment can perform a transparency increasing process. However, in the third embodiment, the transparency increasing process may be performed on the side constituting the stacking cross section but need not be performed on the side constituting the non-stacking cross section. The transparency increasing process may also be performed on a top surface constituting a stacking cross section.

Fourth Embodiment

The first to third embodiments manufacture a three-dimensional object by forming a plurality of chips on the same print medium and stacking these chips. However, the present invention is not limited to this. A three-dimensional object may be manufactured by printing two-dimensional images on print media having no chips and stacking the print media on which the two-dimensional images are printed. This configuration eliminates the need to release the print media on which the two-dimensional images are printed, from the base material, providing an easier manufacturing method than those of the first to third embodiments.

The present embodiment uses the same stacking method as that of the first to third embodiment to stack the print media. That is, if each of the print media used has at least the ink receiving layer and bonding layer, the print media are stacked while being sequentially bonded together via the bonding layers. Further, if each of the print media used has at least the ink receiving layer that becomes adhesive on contact with the ink, the print media are stacked while being sequentially bonded together via the ink receiving layers having become adhesive.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-380069, filed Dec. 28, 2005, 2005-380070 filed Dec. 28, 2005 and 2006-320540 filed Nov. 28, 2006, which are hereby incorporated by reference herein in their entirety.

What is claimed is:

1. A method for manufacturing a three-dimensional object comprising the steps of:
    preparing media each having at least a water-soluble ink receiving layer which exhibits adhesiveness on contact with ink containing a component for making the ink receiving layer insoluble;
    forming a water-insoluble ink image portion on the water-soluble ink receiving layer by ejecting the ink from an ink jet head;
    sequentially stacking the media in such a manner that the media, each having the water-soluble ink receiving layer having the water-insoluble image portion formed thereon, are bonded to each other via the water-soluble ink receiving layer exhibiting the adhesiveness; and
    removing a non-image portion from the water-soluble ink receiving layers of the stacked media by using water.

2. A method for manufacturing a three-dimensional object comprising the steps of:
    preparing a print medium having a plurality of chips including at least a water-soluble ink receiving layer which exhibits adhesiveness on contact with ink;
    forming a water-insoluble image portion on the water-soluble ink receiving layer by ejecting the ink containing a component for making the ink receiving layer insoluble from an ink jet head;
    sequentially stacking the chips in such a manner that the chips, each having the water-soluble ink receiving layer having the water-insoluble image portion formed thereon, are bonded to each other via the water-soluble ink receiving layer exhibiting the adhesiveness; and
    removing a non-image portion from the water-soluble ink receiving layers of the stacked chips by using water.

3. A method for manufacturing a three-dimensional object according to claim 2, wherein the print medium has a releasing layer provided commonly to the plurality of chips;
    the method further comprising the step of releasing the chip having the water-soluble ink receiving layer having the water-insoluble image portion formed thereon from the releasing layer after the forming step and before the stacking step.

4. A method for manufacturing a three-dimensional object according to claim 2, wherein the print medium is transparent.

5. A method for manufacturing a three-dimensional object according to claim 2, further comprising the step of heating the stack after the stacking step and before the removing step.

6. A three-dimensional object manufacturing apparatus comprising:
    an ink jet head configured to eject ink to a water-soluble ink receiving layer in a medium, the medium having at least the water-soluble ink receiving layer which exhibits adhesiveness on contact with the ink containing a component for making the water-soluble ink receiving layer insoluble;
    a stacking unit configured to sequentially stack media in such a manner that the media, each having the water-soluble ink receiving layer having a water-insoluble image portion formed thereon by ejecting the ink from the ink jet head, are bonded to each other via the water-soluble ink receiving layer exhibiting the adhesiveness; and
    a removing unit configured to remove a non-image portion from the water-soluble ink receiving layers of the media stacked by the stacking unit by using water.

* * * * *